(12) United States Patent
Gerstel et al.

(10) Patent No.: US 9,014,562 B2
(45) Date of Patent: Apr. 21, 2015

(54) OPTICAL LINE TERMINAL ARRANGEMENT, APPARATUS AND METHODS

(75) Inventors: Ornan A. Gerstel, Los Altos, CA (US); Rajiv Ramaswami, Sunnyvale, CA (US)

(73) Assignee: Coriant Operations, Inc., Naperville, IL (US)

( * ) Notice: Subject to any disclaimer, the term of this patent is extended or adjusted under 35 U.S.C. 154(b) by 402 days.

(21) Appl. No.: 12/042,793

(22) Filed: Mar. 5, 2008

(65) Prior Publication Data
US 2008/0219666 A1   Sep. 11, 2008

Related U.S. Application Data

(60) Continuation of application No. 10/737,765, filed on Dec. 18, 2003, now Pat. No. 7,369,772, which is a division of application No. 09/293,775, filed on Apr. 19, 1999, now Pat. No. 6,721,508.

(60) Provisional application No. 60/112,510, filed on Dec. 14, 1998.

(51) Int. Cl.
*H04J 14/02* (2006.01)

(52) U.S. Cl.
CPC ......... *H04J 14/0216* (2013.01); *H04J 14/0201* (2013.01); *H04J 14/0212* (2013.01); *H04J 14/0206* (2013.01); *H04J 14/0282* (2013.01); *H04J 14/0286* (2013.01)

(58) Field of Classification Search
USPC .................................. 398/79, 82, 42–74, 95
See application file for complete search history.

(56) References Cited

U.S. PATENT DOCUMENTS

| 3,045,532 A | 7/1962 | Staunton et al. |
| 3,334,956 A | 8/1967 | Stauton et al. |

(Continued)

FOREIGN PATENT DOCUMENTS

| EP | 0 752 794 | 1/1997 |
| EP | 1 039 670 | 9/2000 |

(Continued)

OTHER PUBLICATIONS

R. Ramaswami, "Multiwavelength Lightwave Networks for Computer Communication," IEEE Communications Magazine, pp. 78-88 (1993).

(Continued)

*Primary Examiner* — M. R. Sedighian
(74) *Attorney, Agent, or Firm* — Fitzpatrick, Cella, Harper & Scinto

(57) ABSTRACT

A wavelength division multiplexed optical communication system includes a plurality of optical line terminals which may be part of separate in service networks, each having a line interface and an all-optical pass-through interface including a plurality of pass-through optical ports, and each also including a plurality of local optical ports which are connectable to client equipment and an optical multiplexer/demultiplexer for multiplexing/demultiplexing optical wavelengths. The optical multiplexer/demultiplexer may include one or more stages for inputting/outputting individual wavelengths or bands of a predetermined number of wavelengths, or a combination of bands and individual wavelengths. At least one of the pass-through optical ports of an optical line terminal of one network may be connected to at least one of the pass-through optical ports of an optical line terminal of another network to form an optical path from the line interface of the optical line terminal of the one network to the line interface of the optical line terminal of the another network to form a merged network. The use of such optical line terminals allows the upgrading and merging of the separate networks while in service.

11 Claims, 6 Drawing Sheets

(56) References Cited

U.S. PATENT DOCUMENTS

| | | | |
|---|---|---|---|
| 3,518,426 A | 6/1970 | Campbell et al. | |
| 4,109,300 A | 8/1978 | Reimer | |
| 4,300,239 A | 11/1981 | Wakabayashi et al. | 455/601 |
| 4,500,172 A | 2/1985 | Gagnon et al. | |
| 4,526,469 A | 7/1985 | Egli et al. | |
| 4,593,154 A | 6/1986 | Takeda et al. | |
| 4,650,289 A | 3/1987 | Kuwahara | |
| 4,664,522 A | 5/1987 | LeFebre | |
| 4,673,241 A | 6/1987 | Nishiwaki et al. | |
| 4,705,399 A | 11/1987 | Graindorge et al. | |
| 4,786,146 A | 11/1988 | Ledebuhr | |
| 4,787,081 A | 11/1988 | Waters et al. | |
| 4,821,255 A | 4/1989 | Kobrinski | 370/3 |
| 4,850,045 A | 7/1989 | Funke | 455/607 |
| 4,887,309 A | 12/1989 | Anderson et al. | 455/601 |
| 4,903,338 A | 2/1990 | Funke | |
| 4,915,463 A | 4/1990 | Barbee, Jr. | |
| 4,979,118 A | 12/1990 | Kheradpir | |
| 5,056,919 A | 10/1991 | Arditty et al. | |
| 5,058,103 A | 10/1991 | Shimizu | |
| 5,060,224 A | 10/1991 | Konishi | 398/60 |
| 5,060,226 A | 10/1991 | Gewin et al. | 370/244 |
| 5,073,830 A | 12/1991 | Loucks | |
| 5,076,672 A | 12/1991 | Tsuda et al. | |
| 5,081,619 A | 1/1992 | Nagata | |
| 5,115,305 A | 5/1992 | Baur et al. | |
| 5,137,359 A | 8/1992 | Steele | |
| 5,150,243 A | 9/1992 | Suzuki | 359/110 |
| 5,159,595 A | 10/1992 | Flanagan et al. | |
| 5,162,944 A | 11/1992 | Yamamoto et al. | |
| 5,169,332 A | 12/1992 | Cooke et al. | |
| 5,187,706 A | 2/1993 | Frankel et al. | |
| 5,194,977 A * | 3/1993 | Nishio | 398/48 |
| 5,206,753 A | 4/1993 | Grimes | |
| 5,206,922 A | 4/1993 | Westland et al. | |
| 5,212,713 A | 5/1993 | Frisch | 375/3.1 |
| 5,216,666 A | 6/1993 | Stalick | 370/16.1 |
| 5,218,600 A | 6/1993 | Schenkyr et al. | |
| 5,222,071 A | 6/1993 | Pezeshki et al. | |
| 5,237,435 A | 8/1993 | Kurematsu et al. | |
| 5,265,096 A | 11/1993 | Parruck | 370/110.1 |
| 5,278,689 A | 1/1994 | Gitlin et al. | |
| 5,289,474 A | 2/1994 | Purcell et al. | 714/16 |
| 5,305,322 A | 4/1994 | Kabaya et al. | |
| 5,307,342 A * | 4/1994 | Georigiou et al. | 370/380 |
| 5,311,501 A | 5/1994 | Takatsu | |
| 5,317,439 A | 5/1994 | Fatehi et al. | 359/110 |
| 5,317,445 A | 5/1994 | DeJule et al. | |
| 5,363,228 A | 11/1994 | DeJule et al. | |
| 5,365,518 A | 11/1994 | Noser | |
| 5,367,395 A | 11/1994 | Yajima et al. | 359/110 |
| 5,373,393 A | 12/1994 | DeJule et al. | |
| 5,381,250 A | 1/1995 | Meadows | |
| 5,386,418 A | 1/1995 | Komuro et al. | |
| 5,406,404 A | 4/1995 | DiGiovanni et al. | |
| 5,434,708 A | 7/1995 | Gupta | |
| 5,436,746 A | 7/1995 | Hirst | 359/110 |
| 5,436,867 A | 7/1995 | Mok | |
| 5,446,726 A | 8/1995 | Rostoker et al. | |
| 5,450,225 A | 9/1995 | Bostica et al. | |
| 5,450,512 A | 9/1995 | Asakura | 385/48 |
| 5,457,556 A | 10/1995 | Shiragaki et al. | 359/117 |
| 5,480,319 A | 1/1996 | Vlakancic | |
| 5,481,381 A | 1/1996 | Fujimoto | |
| 5,488,500 A | 1/1996 | Glance | 359/127 |
| 5,493,625 A | 2/1996 | Glance | 385/24 |
| 5,500,756 A | 3/1996 | Tsushima et al. | |
| 5,502,781 A | 3/1996 | Li et al. | |
| 5,504,827 A | 4/1996 | Schimpe | 385/24 |
| 5,510,921 A * | 4/1996 | Takai et al. | 398/79 |
| 5,521,737 A | 5/1996 | Suyama | |
| 5,526,163 A | 6/1996 | Suyama | |
| 5,533,006 A | 7/1996 | Uchida | 370/16.1 |
| 5,550,818 A | 8/1996 | Brackett et al. | 370/395.51 |
| 5,574,722 A | 11/1996 | Slykhouse et al. | |
| 5,592,319 A | 1/1997 | Lee et al. | |
| 5,600,481 A | 2/1997 | Nakabayashi | |
| 5,606,439 A | 2/1997 | Wu | |
| 5,612,805 A | 3/1997 | Fevrier et al. | 359/124 |
| 5,619,489 A | 4/1997 | Chang et al. | 370/241 |
| 5,626,408 A | 5/1997 | Heynderickx et al. | |
| 5,627,969 A * | 5/1997 | Kobayashi et al. | 709/220 |
| 5,640,256 A | 6/1997 | De Vree al. | |
| 5,651,006 A | 7/1997 | Fujino et al. | |
| 5,651,079 A | 7/1997 | Goorjian | |
| 5,673,129 A | 9/1997 | Mizrahi | |
| 5,675,676 A | 10/1997 | Yamashita et al. | 385/24 |
| 5,680,490 A | 10/1997 | Cohen et al. | 385/24 |
| 5,708,753 A | 1/1998 | Frigo et al. | 385/147 |
| 5,710,845 A | 1/1998 | Tajima | |
| 5,712,932 A | 1/1998 | Alexander et al. | 385/24 |
| 5,712,942 A | 1/1998 | Jennings et al. | |
| 5,717,510 A | 2/1998 | Ishikawa et al. | |
| 5,717,795 A | 2/1998 | Sharma et al. | 385/24 |
| 5,719,989 A | 2/1998 | Cushing | |
| 5,726,788 A | 3/1998 | Fee et al. | |
| 5,729,527 A | 3/1998 | Gerstel et al. | 370/228 |
| 5,729,548 A | 3/1998 | Holender | |
| 5,739,935 A | 4/1998 | Sabella | 359/128 |
| 5,742,416 A | 4/1998 | Mizrahi | |
| 5,757,536 A | 5/1998 | Ricco et al. | |
| 5,760,934 A | 6/1998 | Sutter et al. | 359/119 |
| 5,771,112 A | 6/1998 | Hamel et al. | 359/128 |
| 5,777,761 A | 7/1998 | Fee | 359/110 |
| 5,778,118 A | 7/1998 | Sridhar | 385/24 |
| 5,790,287 A | 8/1998 | Darcie et al. | 359/110 |
| 5,790,520 A | 8/1998 | Iwamoto et al. | |
| 5,793,513 A | 8/1998 | Fishman | |
| 5,796,501 A | 8/1998 | Sotom et al. | 359/119 |
| 5,805,320 A * | 9/1998 | Kuroyanagi et al. | 398/56 |
| 5,812,223 A | 9/1998 | Noguchi | |
| 5,822,519 A | 10/1998 | Watanabe | |
| 5,825,515 A | 10/1998 | Anderson | 359/110 |
| 5,825,520 A | 10/1998 | Huber | |
| 5,831,970 A | 11/1998 | Arao | |
| 5,859,846 A | 1/1999 | Kim et al. | |
| 5,864,414 A | 1/1999 | Barnsley et al. | |
| 5,867,289 A | 2/1999 | Gerstel et al. | 359/110 |
| 5,867,291 A | 2/1999 | Wu et al. | 359/124 |
| 5,878,177 A | 3/1999 | Karasan et al. | |
| 5,884,017 A | 3/1999 | Fee | 395/182.02 |
| 5,903,370 A * | 5/1999 | Johnson | 398/4 |
| 5,903,686 A | 5/1999 | MacDonald | |
| 5,911,018 A | 6/1999 | Bischel et al. | |
| 5,920,588 A | 7/1999 | Watanabe | |
| 5,920,666 A | 7/1999 | Digonnet et al. | |
| 5,930,016 A * | 7/1999 | Brorson et al. | 398/79 |
| 5,940,197 A | 8/1999 | Ryu | 359/152 |
| 5,941,955 A | 8/1999 | Wilby et al. | |
| 5,943,453 A | 8/1999 | Hodgson | |
| 5,949,560 A | 9/1999 | Roberts et al. | |
| 5,953,141 A | 9/1999 | Liu et al. | 359/124 |
| 5,959,767 A | 9/1999 | Fatehi et al. | 359/341 |
| 5,960,133 A | 9/1999 | Tomlinson | 385/18 |
| 5,970,072 A | 10/1999 | Gammenthaler et al. | |
| 5,974,216 A | 10/1999 | Nakaya | |
| 5,978,354 A | 11/1999 | Taketomi et al. | |
| 5,986,783 A | 11/1999 | Sharma et al. | 359/119 |
| 5,999,290 A | 12/1999 | Li | |
| 5,999,291 A | 12/1999 | Anderson | 359/133 |
| 6,002,818 A | 12/1999 | Fatehi et al. | |
| 6,008,916 A | 12/1999 | Khaleghi | 359/110 |
| 6,014,475 A | 1/2000 | Frisken | |
| 6,020,963 A | 2/2000 | DiMarzio | |
| 6,025,947 A | 2/2000 | Sugaya et al. | |
| 6,031,653 A | 2/2000 | Wang | |
| 6,041,151 A | 3/2000 | Mendlovic et al. | |
| 6,055,092 A | 4/2000 | Sugaya et al. | |
| 6,061,157 A | 5/2000 | Terahara | 359/124 |
| 6,061,482 A | 5/2000 | Davis | |
| 6,067,178 A | 5/2000 | Zheng | |
| 6,067,288 A | 5/2000 | Miller et al. | |
| 6,070,982 A | 6/2000 | Aritake | |
| 6,078,596 A | 6/2000 | Wellbrock | |

(56) References Cited

U.S. PATENT DOCUMENTS

| | | | |
|---|---|---|---|
| 6,082,861 A | 7/2000 | Dove et al. | |
| 6,084,694 A | 7/2000 | Milton et al. | 359/124 |
| 6,088,102 A | 7/2000 | Manhart | |
| 6,097,859 A | 8/2000 | Solgaard et al. | 385/17 |
| 6,101,011 A | 8/2000 | Taylor | |
| 6,101,013 A | 8/2000 | Monacos | |
| 6,108,113 A | 8/2000 | Fee | 359/124 |
| 6,108,311 A | 8/2000 | Ramaswami et al. | 370/258 |
| 6,115,157 A | 9/2000 | Barnard et al. | 398/1 |
| 6,115,517 A | 9/2000 | Shiragaki et al. | 385/24 |
| 6,122,095 A | 9/2000 | Fatehi | |
| 6,122,096 A | 9/2000 | Fatehi | |
| 6,134,047 A | 10/2000 | Flood et al. | 359/341 |
| 6,137,608 A | 10/2000 | White | |
| 6,141,125 A | 10/2000 | Blair et al. | 398/32 |
| 6,147,786 A | 11/2000 | Pan | |
| 6,151,023 A | 11/2000 | Chari | |
| 6,157,419 A | 12/2000 | Mitsutake | |
| 6,167,041 A | 12/2000 | Afanador | |
| 6,169,016 B1 | 1/2001 | Chien et al. | 438/533 |
| 6,169,616 B1 | 1/2001 | Cao | 359/130 |
| 6,176,586 B1 | 1/2001 | Hirose et al. | |
| 6,198,857 B1 | 3/2001 | Grasis | |
| 6,204,943 B1 | 3/2001 | Hamel et al. | 359/119 |
| 6,204,946 B1 | 3/2001 | Aksyuk et al. | 359/131 |
| 6,208,442 B1 | 3/2001 | Liu et al. | |
| 6,208,443 B1 | 3/2001 | Liu et al. | 359/127 |
| 6,215,222 B1 | 4/2001 | Hoen | |
| 6,215,592 B1 | 4/2001 | Pelekhaty | |
| 6,233,074 B1 | 5/2001 | Lahat et al. | 359/118 |
| 6,240,087 B1 | 5/2001 | Cummings et al. | |
| 6,240,222 B1 | 5/2001 | Bergmann | 385/24 |
| 6,243,194 B1 | 6/2001 | Brazas, Jr. | |
| 6,249,510 B1 | 6/2001 | Thompson | 370/223 |
| 6,253,000 B1 | 6/2001 | Madsen et al. | |
| 6,259,831 B1 | 7/2001 | Faris et al. | |
| 6,260,062 B1 | 7/2001 | Davis et al. | |
| 6,263,126 B1 | 7/2001 | Cao | 385/24 |
| 6,272,154 B1 | 8/2001 | Bala et al. | 370/535 |
| 6,275,499 B1 | 8/2001 | Wynn et al. | |
| 6,278,689 B1 | 8/2001 | Afferton et al. | 370/223 |
| 6,285,478 B1 | 9/2001 | Liu et al. | 359/127 |
| 6,285,479 B1 | 9/2001 | Okazaki et al. | 359/133 |
| 6,285,673 B1 | 9/2001 | Blackburn et al. | |
| 6,288,812 B1 | 9/2001 | Duerksen | |
| 6,292,905 B1 | 9/2001 | Wallach et al. | |
| 6,295,146 B1 | 9/2001 | Nathan et al. | 359/119 |
| 6,297,895 B1 | 10/2001 | Okuno | 359/124 |
| 6,307,657 B1 | 10/2001 | Ford | 359/130 |
| 6,314,215 B1 | 11/2001 | Shay et al. | |
| 6,320,877 B1 | 11/2001 | Humphrey et al. | |
| 6,333,798 B1 | 12/2001 | Allan et al. | |
| 6,333,799 B1 | 12/2001 | Bala et al. | 359/128 |
| 6,334,010 B1 | 12/2001 | Sotom et al. | |
| 6,335,831 B2 | 1/2002 | Kowarz et al. | |
| 6,337,762 B1 | 1/2002 | Ueno | |
| 6,339,488 B1 | 1/2002 | Beshai et al. | |
| 6,348,985 B1 | 2/2002 | Jiang et al. | |
| 6,351,323 B1 | 2/2002 | Onaka et al. | 359/187 |
| 6,351,581 B1 | 2/2002 | Doerr et al. | 385/24 |
| 6,356,282 B2 | 3/2002 | Roytman et al. | |
| 6,356,367 B1 | 3/2002 | DeCusatis et al. | 398/5 |
| 6,363,183 B1 | 3/2002 | Koh | |
| 6,366,377 B1 | 4/2002 | Tajima | |
| 6,366,716 B1 | 4/2002 | Graves | |
| 6,389,015 B1 | 5/2002 | Huang et al. | |
| 6,404,948 B2 | 6/2002 | Alexander et al. | 385/24 |
| 6,411,412 B1 | 6/2002 | Jiang et al. | |
| 6,411,623 B1 | 6/2002 | DeGollado et al. | |
| 6,417,944 B1 | 7/2002 | Lahat et al. | |
| 6,426,815 B1 * | 7/2002 | Koehler | 398/59 |
| 6,433,900 B1 | 8/2002 | Kuroyanagi et al. | 359/110 |
| 6,434,288 B1 | 8/2002 | Uemura et al. | |
| 6,452,701 B1 | 9/2002 | Terahara et al. | 359/110 |
| 6,453,085 B1 | 9/2002 | Ressl | |
| 6,459,516 B1 | 10/2002 | Mizrahi et al. | 359/127 |
| 6,466,348 B1 | 10/2002 | Izumi | |
| 6,487,686 B1 | 11/2002 | Yamazaki et al. | |
| 6,490,080 B2 | 12/2002 | Cornelius et al. | |
| 6,493,117 B1 | 12/2002 | Milton et al. | 359/124 |
| 6,493,473 B1 | 12/2002 | Wooten | |
| 6,504,630 B1 | 1/2003 | Czarnocha et al. | 359/110 |
| 6,507,421 B1 | 1/2003 | Bishop et al. | |
| 6,519,064 B1 | 2/2003 | Fatehi et al. | |
| 6,525,852 B1 | 2/2003 | Egnell | |
| 6,535,309 B1 | 3/2003 | Terahara | |
| 6,535,312 B2 | 3/2003 | Hajjar et al. | |
| 6,535,313 B1 | 3/2003 | Fatehi et al. | |
| 6,545,783 B1 | 4/2003 | Wu et al. | 359/127 |
| 6,567,196 B1 | 5/2003 | Archambault | 359/124 |
| 6,567,429 B1 | 5/2003 | DeMartino | |
| 6,567,576 B2 | 5/2003 | MacDonald | |
| 6,570,685 B1 | 5/2003 | Fujita et al. | |
| 6,580,534 B2 | 6/2003 | Madsen | |
| 6,584,243 B2 | 6/2003 | Wolf | |
| 6,587,239 B1 | 7/2003 | Hung | |
| 6,587,608 B2 | 7/2003 | Cormack | |
| 6,594,046 B1 | 7/2003 | Nishino | |
| 6,594,068 B2 | 7/2003 | Sui | |
| 6,603,770 B2 | 8/2003 | Lin et al. | |
| 6,606,427 B1 | 8/2003 | Graves et al. | |
| 6,631,018 B1 | 10/2003 | Milton et al. | |
| 6,647,208 B1 | 11/2003 | Kirby | |
| 6,650,803 B1 | 11/2003 | Ramaswami et al. | |
| 6,668,106 B1 | 12/2003 | Levine et al. | |
| 6,684,003 B2 | 1/2004 | Lipson et al. | |
| 6,697,546 B2 | 2/2004 | Ibukuro et al. | |
| 6,708,000 B1 | 3/2004 | Nishi et al. | |
| 6,721,508 B1 * | 4/2004 | Gerstel et al. | 398/83 |
| 6,731,832 B2 | 5/2004 | Alvarez et al. | |
| 6,735,393 B1 | 5/2004 | Zouganeli | |
| 6,738,825 B1 | 5/2004 | Bortolotto et al. | |
| 6,741,811 B2 | 5/2004 | Nishi et al. | |
| 6,754,174 B1 | 6/2004 | Ben-Zur et al. | |
| 6,763,192 B1 | 7/2004 | Jagannathan | |
| 6,771,849 B1 | 8/2004 | Fang et al. | |
| 6,771,905 B1 | 8/2004 | Bortz | |
| 6,782,154 B2 | 8/2004 | Zhao et al. | |
| 6,782,203 B2 | 8/2004 | Lin et al. | 398/82 |
| 6,788,896 B1 | 9/2004 | Wang et al. | |
| 6,792,174 B1 | 9/2004 | Ramaswami | |
| 6,798,941 B2 | 9/2004 | Smith et al. | |
| 6,822,860 B2 | 11/2004 | Owens et al. | |
| 6,826,368 B1 | 11/2004 | Koren et al. | |
| 6,847,479 B1 | 1/2005 | Islam et al. | |
| 6,853,763 B1 | 2/2005 | McNicol et al. | |
| 6,856,459 B1 | 2/2005 | Islam et al. | |
| 6,868,201 B1 | 3/2005 | Johnson et al. | |
| 6,888,661 B1 | 5/2005 | Islam et al. | |
| 6,898,376 B1 | 5/2005 | Gerstel et al. | 398/5 |
| 6,925,257 B2 | 8/2005 | Yoo | |
| 6,930,824 B1 | 8/2005 | Ishikawa et al. | |
| 6,940,647 B2 | 9/2005 | Islam et al. | |
| 6,944,405 B2 | 9/2005 | Lee et al. | |
| 6,947,670 B1 | 9/2005 | Korotky et al. | |
| 6,970,433 B1 | 11/2005 | Ramaswami et al. | 370/255 |
| 6,973,229 B1 | 12/2005 | Tzathas et al. | |
| 6,978,090 B1 | 12/2005 | Forbes et al. | |
| 6,995,917 B1 | 2/2006 | Sampsell et al. | |
| 6,999,677 B2 | 2/2006 | Graves et al. | |
| 6,999,682 B2 | 2/2006 | Dasylva et al. | |
| 7,009,966 B2 | 3/2006 | Borchering | 370/386 |
| 7,010,225 B1 | 3/2006 | Dasylva et al. | |
| 7,020,077 B2 | 3/2006 | Mazzurco et al. | |
| 7,054,310 B1 | 5/2006 | Shivji et al. | |
| 7,054,557 B1 | 5/2006 | Dasylva et al. | |
| 7,085,445 B2 | 8/2006 | Koh et al. | |
| 7,106,966 B1 | 9/2006 | Lalonde et al. | |
| 7,110,668 B2 | 9/2006 | Gerstel et al. | 398/5 |
| 7,110,674 B2 | 9/2006 | Nakajima et al. | |
| 7,113,674 B2 | 9/2006 | Ohta et al. | |
| 7,130,540 B2 | 10/2006 | Simmons et al. | |
| 7,133,616 B2 | 11/2006 | Caroli | |
| 7,139,277 B2 | 11/2006 | Ofek et al. | |

(56) References Cited

U.S. PATENT DOCUMENTS

| | | | |
|---|---|---|---|
| 7,145,704 B1 | 12/2006 | Islam | |
| 7,149,426 B2 | 12/2006 | Goel | |
| 7,155,124 B2 | 12/2006 | Peddanarappagari et al. | |
| 7,181,138 B1 | 2/2007 | Gerstel et al. | 398/33 |
| 7,184,666 B1 | 2/2007 | Li et al. | |
| 7,194,207 B2 | 3/2007 | Rasala et al. | |
| 7,227,681 B2 | 6/2007 | Sugaya et al. | 359/337.1 |
| 7,236,704 B1 | 6/2007 | Cao | |
| 7,274,873 B2 | 9/2007 | Bortz | |
| 7,292,786 B1 | 11/2007 | Barbarossa et al. | |
| 7,305,186 B2 | 12/2007 | Islam | |
| 7,369,772 B2 | 5/2008 | Gerstel et al. | |
| 7,477,447 B2 | 1/2009 | Sugaya et al. | |
| 7,492,986 B1 | 2/2009 | Kelly | |
| 7,522,836 B2 | 4/2009 | Islam | |
| 7,573,818 B2 | 8/2009 | Väänänen et al. | |
| 7,630,634 B1 | 12/2009 | Boduch | |
| 7,751,714 B2 | 7/2010 | Zhong et al. | |
| 7,781,714 B2 | 8/2010 | Lee et al. | |
| 8,089,683 B2 | 1/2012 | Holmes | |
| 8,320,759 B2 | 11/2012 | Boduch | |
| 2001/0024542 A1 | 9/2001 | Aina et al. | 385/24 |
| 2001/0030797 A1 | 10/2001 | Kosaka et al. | |
| 2001/0050790 A1 | 12/2001 | Graves et al. | |
| 2002/0004828 A1 | 1/2002 | Davis et al. | |
| 2002/0012488 A1 | 1/2002 | Franceus | |
| 2002/0018263 A1 | 2/2002 | Ge et al. | |
| 2002/0021862 A1 | 2/2002 | Zhou et al. | |
| 2002/0048066 A1 | 4/2002 | Antoniades et al. | |
| 2002/0057477 A1 | 5/2002 | Rocca et al. | |
| 2002/0057861 A1 | 5/2002 | Ge et al. | |
| 2002/0071154 A1 | 6/2002 | Gerstel et al. | 359/124 |
| 2002/0075547 A1 | 6/2002 | Mashinsky | |
| 2002/0080440 A1 | 6/2002 | Li et al. | |
| 2002/0089715 A1 | 7/2002 | Mesh et al. | |
| 2002/0093707 A1 | 7/2002 | Katagiri et al. | |
| 2002/0097469 A1 | 7/2002 | Yee et al. | |
| 2002/0101631 A1 | 8/2002 | Gerstel et al. | |
| 2002/0101636 A1 | 8/2002 | Xiao et al. | |
| 2002/0103921 A1 | 8/2002 | Nair et al. | |
| 2002/0109877 A1 | 8/2002 | Funk | |
| 2002/0109880 A1 | 8/2002 | Mukherjee et al. | |
| 2002/0110134 A1 | 8/2002 | Gracon et al. | |
| 2002/0118417 A1 | 8/2002 | Barry et al. | |
| 2002/0145779 A1 | 10/2002 | Strasser et al. | |
| 2002/0165962 A1 | 11/2002 | Alverez et al. | |
| 2002/0174207 A1 | 11/2002 | Battou | |
| 2002/0176131 A1 | 11/2002 | Walters et al. | |
| 2003/0002104 A1 | 1/2003 | Caroli et al. | |
| 2003/0007209 A1 | 1/2003 | Liu et al. | |
| 2003/0023709 A1 | 1/2003 | Alverez et al. | |
| 2003/0091267 A1 | 5/2003 | Alverez et al. | |
| 2003/0163555 A1 | 8/2003 | Battou et al. | |
| 2003/0179741 A1 | 9/2003 | Goergen | |
| 2004/0028407 A1 | 2/2004 | Noheji | |
| 2004/0033079 A1 | 2/2004 | Sheth et al. | |
| 2004/0042795 A1 | 3/2004 | Doerr et al. | |
| 2004/0076438 A1 | 4/2004 | Lee | |
| 2004/0085964 A1 | 5/2004 | Vaanamen | |
| 2004/0131356 A1 | 7/2004 | Gerstel et al. | |
| 2004/0175179 A1 | 9/2004 | Xiao et al. | |
| 2004/0184809 A1 | 9/2004 | Miyata et al. | |
| 2004/0190901 A1 | 9/2004 | Fang | |
| 2004/0208501 A1 | 10/2004 | Saunders et al. | |
| 2004/0233426 A1 | 11/2004 | Komachi et al. | |
| 2004/0247239 A1 | 12/2004 | Eldada | |
| 2005/0047795 A1 | 3/2005 | Windover et al. | |
| 2005/0078461 A1 | 4/2005 | Dobbs et al. | |
| 2005/0089027 A1 | 4/2005 | Colton | |
| 2005/0104508 A1 | 5/2005 | Ozawa et al. | |
| 2005/0111504 A1 | 5/2005 | Nishikawa et al. | |
| 2005/0195737 A1 | 9/2005 | Rajan et al. | |
| 2005/0197720 A1 | 9/2005 | Morrison et al. | |
| 2005/0281558 A1 | 12/2005 | Wang et al. | |
| 2006/0034610 A1 | 2/2006 | Akiyama et al. | |
| 2006/0115210 A1 | 6/2006 | Nakagawa | |
| 2006/0133804 A1 | 6/2006 | Boduch et al. | |
| 2006/0133807 A1 | 6/2006 | Jenkins et al. | |
| 2006/0177225 A1 | 8/2006 | Paraschis et al. | |
| 2007/0165299 A1 | 7/2007 | Sugaya et al. | |
| 2007/0201867 A1 | 8/2007 | DeLew et al. | |
| 2007/0206602 A1 | 9/2007 | Halabi et al. | |
| 2007/0237520 A1 | 10/2007 | DeLew et al. | |
| 2007/0237523 A1 | 10/2007 | Miguel et al. | |
| 2007/0237524 A1 | 10/2007 | Gerstel et al. | |
| 2007/0264016 A1 | 11/2007 | DeLew | |
| 2008/0008474 A1 | 1/2008 | Boduch et al. | |
| 2008/0013953 A1 | 1/2008 | Boduch et al. | |
| 2008/0013954 A1 | 1/2008 | Boduch et al. | |
| 2009/0086310 A1 | 4/2009 | Sugaya et al. | |
| 2009/0148166 A1 | 6/2009 | Akiyama et al. | |
| 2011/0013911 A1 | 1/2011 | Alexander et al. | |

FOREIGN PATENT DOCUMENTS

| | | |
|---|---|---|
| EP | 1 039 773 | 9/2000 |
| EP | 1 065 822 | 1/2001 |
| EP | 1 202 595 A1 | 5/2002 |
| EP | 1 434 374 A1 | 6/2004 |
| EP | 1 610 475 | 12/2005 |
| EP | 1 628 424 | 2/2006 |
| FI | 112421 | 11/2003 |
| FI | 115100 | 2/2005 |
| GB | 861259 A | 2/1961 |
| GB | 8601545 | 1/1986 |
| GB | 2346280 | 8/2000 |
| GB | 2394856 | 9/2005 |
| JP | 5-226780 | 9/1993 |
| JP | 8-111447 | 4/1996 |
| JP | 8-248455 | 9/1996 |
| JP | 9-261175 | 10/1997 |
| WO | WO 95/19689 | 7/1995 |
| WO | 01/95661 | 12/2001 |
| WO | 2005039122 | 4/2005 |
| WO | 2006/003164 | 1/2006 |
| WO | 2007/100992 | 9/2007 |
| WO | 2008/008277 | 1/2008 |

OTHER PUBLICATIONS

R. Ramaswami et al., "Design of Logical Topologies for Wavelength-Routed Optical Networks," IEEE Journal on Selected Areas in Communications, V. 14, N. 5, pp. 840-851 (1996).

O. Gerstel et al., "Cost Effective Traffic Grooming in WDM Rings," IEEE Infocom, San Francisco, Mar. 29-Apr. 2, 1998, pp. 69-77.

R. Ramaswami et al., "Routing and Wavelength Assignment in All—Optical Networks," IEEE/ACM Transactions on Networking, V. 3, No. 5, pp. 489-500 (1995).

R. Ramaswami et al., "Multiwavelength Optical Networks with Limited Wavelength Conversion," IEEE Infocom, vol. 2, pp. 489-498, 1997.

R. Ramaswami et al., *Optical Networks, A Practical Perspective,* Academic Press (1998). (Complete Book).

B. Van Caenegem et al., *Internal Connectivity of Optical Crossconnects in Opaque Networks,* International Conference on Integrated Optics and Optical Fiber Communication, OFC/IOOC '99 Technical Digest, vol. 1, pp. 159-161 (1999), Attached as Exhibit B (Civil Action No. 08 CV 3379, Mar. 26, 2009) and Exhibit F (Request for Inter Partes Reexamination of U.S. Patent No. 7,369,772, Jul. 2, 2009.

G. Chang et al., *Multiwavelength Reconfigurable WDM/ATM/SONET Network Testbed,* Journal of Lightwave Technology, vol. 14, No. 6, pp. 1320-1340 (Jun. 1996), Attached as Exhibit K (Civil Action No. 08 CV 3379, Mar. 26, 2009) and Exhibit D (Request for Inter Partes Reexamination of U.S. Patent No. 7,369,772, Jul. 2, 2009.

R.E. Wagner et al., *MONET: Multiwavelength Optical Networking,* IEEE/OSA JLT/JSAC, Special Issue on Multiwavelength Optical Technology and Networks, vol. 14, No. 6, pp. 1349-1355 (Jun. 1996), Attached as Exhibit N (Civil Action No. 08 CV 3379, Mar. 26, 2009) and Exhibit E (Request for Inter Partes Reexamination of U.S. Patent No. 7,369,772, Jul. 2, 2009.

(56) References Cited

OTHER PUBLICATIONS

O. Gerstel et al., *Combined WDM an SONET Network Design*, Proc. IEEE Infocom '99, vol. 2, pp. 734-743 (Mar. 1999), Attached as Exhibit O, Civil Action No. 08 CV 3379, Mar. 26, 2009.

Hjelme et al., "Reconfigurable All-fiber All-optical Cross-connect Node Using Synthesized Fiber Bragg Gratings for Both Demultiplexing and Switching", OFC '98, Technical Digest, pp. 65-66 (1998).

Kawai et al., "Crosstalk Reduction in NxN WDM Multi/Demultiplexers by Cascading Small Arrayed Waveguide Gratings (AWG's)", Journal of Lightwave Technology, 15(10), pp. 1929-1937 (1997).

Kawai et al., "Design of a Large Scale Optical Wavelength Routing Circuit", Proceedings of the 1995 Communications Society Conference of IEICE, B-705, p. 372.

Obara et al., "Virtually Crosstalk-free Wavelength Routing Network Architecture", Electronics Letters, 32(12), pp. 1123-1125 (1996).

Ramaswami et al., "Fiber-optic Networks: Future Trends", Journal of IETE, 39(2), pp. 59-68 (1993).

Gerstel et al., "Benefits of Limited Wavelengths Conversion in WDM Right Networks", OCF '97, Feb. 16-21, 1997, pp. 119 and 120.

Gerstel et al., "Fault Tolerant Multiwavelength Optical Rings with Limited Wavelength Conversion", IEEE Journal on Selected Areas in Communication, 16(7), pp. 1166-1178 (1998).

Ho et al., "Eight-channel Bidirectional WDM Add/Drop Multiplexer", Electronics Letters, 34(10), pp. 947 and 948 (1998).

McGreer, K.A., "Arrayed Waveguide Gratings for Wavelength Routing", IEEE Communications Magazine, 36(12), pp. 62-68 (1998).

Stern, T.E., "Linear Lightwave Networks: How Far Can They Go?", IEEE GLOBECOM '90, 3, pp. 1866-1872 (1990).

Sasaki et al, "A WDM Ring Network for Incremental Traffic", Proceedings Thirty-sixth Annual Allerton Conference on Communication Control and Computing, pp. 662-672.

Berthold, J., "Evolution of WDM in Transport Networks", OFC '98 Feb. 22-27, 1998, Technical Digest, pp. 133.

Davis et al., "Optical Cross-connect System Technology Trial", OFC '98 Feb. 22-27, 1998, pp. 27 and 28.

Dono et al., "A Wavelength Division Multiple Access Network for Computer Communication", IEEE Journal on Selected Areas in Communication, 8(6), pp. 983-994 (1990).

Janniello et al., "Multiplex-protocol Optical-fiber Multiplexer for Remote Computer Interconnection", in Optical Fiber Communications Conference, vol. 8, 1995 OSA Technical Digest Series, paper WO1.

Pedrotti et al., "WEST 120-Gbit/s 3×3 Wavelength-division Multiplexed Cross-connect", OFC '98, Feb. 22-27, 1998, Technical Digest, pp. 66 and 67.

Tsushima et al., "Optical Cross-connect Systems for Restoration of Backbone Fiber Networks", OFC '98, Feb. 22-27, 1998, Technical Digest, pp. 271 and 272.

Antoniades et al., "Crosstalk Performance of a Wavelength Selective Cross-connect Mesh Topology", OFC '98, Feb. 22-27, 1998, Technical Digest, pp. 61 and 62.

Berger et al., "Pan European Optical Networking Using Wavelength Division Multiplexing", IEEE Communications Magazine, 35(4), pp. 82-88 (1997).

Gaudino et al., "Remote Provisioning of a Reconfigurable WDM Multichannel Add/drop Multiplexer", IEEE Photonics Technology Letters, 11(8), pp. 1060-1062 (1999).

Jourdan et al., "Design and Implementation of a Fully Reconfigurable All-optical Crossconnect for High Capacity Multiwavelength Transport Networks", Journal of Lightwave Technology, 14(6), pp. 1198-1206 (1996).

Aggarwal et al., "Efficient Routing in Optical Networks", Journal of the ACM, 43(6), pp. 973-1001 (1996).

De Zhong et al., "Multiwavelength Cross-connects for Optical Transport Networks", Journal of Lightwave Technology, 14(7), pp. 1613-1620 (1996).

McCammon et al., "Deployment of The National Transparent Optical Network Around the San Francisco Bay Area", Lawrence Livermore National Laboratory, 15 sheets (1996).

Almstrom et al., "Cascadability of Optical Add/Drop Multiplexers", 24th European Conference on Optical Communication, Sep. 20-24, 1998, 1, pp. 589 and 590.

Caspar et al., "4×2.5 Gbit/s, NRZ Transmission Experiments Over Transparent Crossconnects with Optoelectronic Frequency Converters and Dispersion Compensated Standard Single-mode Fiber Links", Proceedings of 1998 3rd Optoelectronics and Comm. Conference, E82-B/8, p. 1127 (1999).

Clark, L., "Evolution of Optical Transport in the AT&T Network", OFC '98, Feb. 22-27, 1998, Technical Digest, p. 70.

Clark, L., "WDM Expands Fibers Horizons", LAN Magazine, 12(3), p. 67 (1997).

Delve, P.A., "BT's WDM Trail-integrating WDM Into an Existing Network", IEE Colloquium on Multiwavelength Optical Networks: Devices, Systems and Network Implementations (Ref. No. 1998/257), pp. 13/1-13/4 (1998).

Ehrhardt et al., "Testbed for WDM Field Trials Over 750km with Full Compensation of Chromatic Dispersion", IEE Colloquium on High Speed and Long Distance Transmission (Ref. No. 1999/022), pp. 5/1-5/5 (1999).

Goldstein et al., "Optical Networking Visions", Optical Society of America, Technical Digest, p. 275 (1999).

Hofmeister et al., "Project LEARN—Light Exchangeable, Add/Drop Ring Network", Proceedings of Optical Fiber Comm. Conf., 6, p. 467 (1997).

Kaminow et al., "Chapter 15: Advanced Multiaccess Lightwave Networks", Optical Fiber Telecommunications IIIA, Academic Press, pp. 561, 562, 566-576, and 576-581 (1997).

Karasan et al., "Optical Restoration at the Wavelength-multiplex Section Level in WDM Mesh Networks", IEEE Photonics Technology Letters, 10(9), pp. 1343-1345 (1998).

Kojucharow et al., "A Wireless LAN at 60 GHz-novel System Design and Transmission Experiments", IEEE MTT-S International Microwave Symposium Digest, 3, pp. 1513-1516 (1998).

Lin et al., "Layered Switch Architectures for High-capacity Optical Fiber Communications", ECOC '97, Sep. 22-25, 1997, 2(448), pp. 249-252.

MacDonald et al., "Optoelectronic Switching: Technology and Architecture", Proceedings of SPIE, 2918, pp. 2-13 (1997).

Mikkelsen et al., "Impact on Traffic and Transmission Performance of All-optic Wavelength Converters Placed at the Network Interface or in OXCNs", Conference on OFC '97, Feb. 16-21, 1997, pp. 124 and 125.

Pedersen et al., "WDM Cross-connect Cascade Based on All-optical Wavelength Converters for Routing and Wavelength Slot Interchanging Using a Reduced Number of Internal Wavelengths", OFC '98,Feb. 22-27, 1998, Technical Digest, pp. 58 and 59.

Santos, J., "Net Expansion Depends on Optical Layer", Electronic Engineering Times, Dec. 1, 2007, p. 108.

Gerstel, O., "On the Future of Wavelength Routing Networks", IEEE Network, 10(6), pp. 14-20 (1996).

Wauters et al., "Design of the Optical Path Layer in Multiwavelength Cross-connected Networks", IEEE Journal on Selected Areas in Communication, 14(5), pp. 881-892 (1996).

Gerstel et al., "Upgrading SONET Rings with WDM Instead of TDM: An Economic Analysis", OFC/IOOC '99, Technical Digest, Feb. 21-26, 1999, 3, pp. 75-77.

Shimomura et al., "Wavelength-division Add/Drop Multiplexer Using a Single Wavelength-filter and Back-reflector Switches," OFC Apos, 1998, Technical Digest, Feb. 22-27, 1998, pp. 80-82.

JDS Fitel Datasheet for WD1508 M2/D2 Series 8 Channel 200 Ghz Spaced ITU-WDM Multiplexers/Demultiplexers.

Defendants Fujitsu Limited's and Fujitsu Network Communications, Inc.'s Preliminary Invalidity Contentions, *Fujitsu Limited and Fujitsu Network Communications, Inc.*, Civil Action No. 08 CV 3379, Feb. 27, 2009.

Defendant Fujitsu Limited's Amended Answer and Affirmative Defenses to Plaintiff's Complaint and, Defendant Fujitsu Limited's Amended Counterclaims Against Plaintiff, Tellabs, Inc. and Tellabs

(56) References Cited

OTHER PUBLICATIONS

North America, Inc., and Demand for Jury Trial, *Fujitsu Limited*, Civil Action No. 08 CV 3379, Mar. 26, 2009.
Defendant Fujitsu Network Communications, Inc.s' Amended Answer and Affirmative Defenses to Plaintiff's Complaint, and Defendant Fujitsu Network Comunications, Inc.s' Amended Counterclaims Against Plaintiff, and Demand for Jury Trial, *Fujitsu Network Communications, Inc.*, Civil Action No. 08 CV 3379, Mar. 26, 2009.
Fujitsu's Preliminary Invalidity Contentions for the '772 Patent-Exhibit Al, U.S. Pat. No. 6,333,799, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A2, U.S. Pat. No. 5,930,016, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A3, U.S. Pat. No. 6,169,616, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A4(A), "The Chang" reference, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A4(B), "The Chang" reference, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A5, U.S. Pat. No. 6,134,047, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A6, "The Gerstel" reference, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A7(A), U.S. Pat. No. 6,426,815, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A7(B), U.S. Pat. No. 6,426,815, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A8, U.S. Pat. No. 6,233,074, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A9, The Caenegem reference, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit A10, The Wagner reference, *Fujitsu Limited and Fujitsu Network Communications, Inc.*, Civil Action No. 08 CV 3379, Feb. 27, 2009.
Fujitsu's Preliminary Invalidity Contentions for the '772 Patent-Exhibit All, U.S. Pat. No. 6,545,783, *Fujitsu Limited and Fujitsu Network Communications, Inc.*, Civil Action No. 08 CV 3379, Feb. 27, 2009.
Digest, vol. 1, pp. vi, xvii (1999) (Showing the Agenda that Caenegem's Presentation was Scheduled for Presentation at 3:45pm in Room 6D on Tuesday, Feb. 23, 1999) Attached as Exhibit C, Civil Action No. 08 CV 3379, Mar. 26, 2009.
International Conference on Integrated Optics and Optical Fiber Communication, OFC/IOOC '99 Technical Digest, vol. 3, pp. vii, xi (1999) (Showing the Agenda that Gerstel and Ramaswami's paper was Scheduled for Presentation at 9:45 am in Room 5A on Thursday, Feb. 25, 1999) Attached as Exhibit D, Civil Action No. 08 CV 3379, Mar. 26, 2009.
Fujitsu Limited's and Fujitsu Network Communications, Inc.'s Motion for Leave to File Amended Answer and Amended Counterclaims, *Fujitsu Limited and Fujitsu Network Communications, Inc.*, Civil Action No. 08 CV 3379, Mar. 26, 2009.
Fujitsu Limited's Request for Inter Partes Reexamination, regarding U.S. Patent No. 7,369,772, *Fujitsu Limited*, Jul. 2, 2009.
P. Green, Jr., "Fiber Optic Networks," Prentice-Hall, Inc., 1993, Attached as Exhibit K of Request for Inter Partes Reexamination of U.S. Patent No. 7,369,772, Jul. 2, 2009 (entire textbook).
U.S. Pat. No. 6,169,616 Annotated Figure 7, Attached as Exhibit B-1 of Request for Inter Partes Reexamination of U.S. Patent No. 7,369,772 (Jul. 2, 2009).
U.S. Pat. No. 6,169,616 Alternatively Annotated Figure 7, Attached as Exhibit B-2 of Request for Inter Partes Reexamination of U.S. Patent No. 7,369,772 (Jul. 2, 2009).
U.S. Pat. No. 6,545,783 Annotated Figure 1, Attached as Exhibit C-1 of Request for Inter Partes Reexamination of U.S. Patent No. 7,369,772 (Jul. 2, 2009).
Change Reference Annotated Figure 17, Attached as Exhibit D-1 of Request for Inter Partes Reexamination of U.S. Patent No. 7,369,772 (Jul. 2, 2009).
Wagner Reference Annotated Figure 3, Attached as Exhibit E-1 of Request for Inter Partes Reexamination of U.S. Patent No. 7,369,772 (Jul. 2, 2009).
Wagner Reference Annotated Figure 3, Attached as Exhibit E-2 of Request for Inter Partes Reexamination of U.S. Patent No. 7,369,772 (Jul. 2, 2009).
Caenegem Reference Annotated Figure 1, Attached as Exhibit F-1 of Request for Inter Partes Reexamination of U.S. Patent No. 7,369,772 (Jul. 2, 2009).
Caenegem Reference Annotated Figure 1, Attached as Exhibit F-2 of Request for Inter Partes Reexamination of U.S. Patent No. 7,369,772 (Jul. 2, 2009).
U.S. Pat. No. 6,426,815 Annotated Figure 3, Attached as Exhibit G-1 of Request for Inter Partes Reexamination of U.S. Patent No. 7,369,772 (Jul. 2, 2009).
U.S. Pat. No. 6,426,815 Annotated Figure 8, Attached as Exhibit G-2 of Request for Inter Partes Reexamination of U.S. Patent No. 7,369,772 (Jul. 2, 2009).
U.S. Pat. No. 6,426,815 Annotated Figure 2, Attached as Exhibit G-3 of Request for Inter Partes Reexamination of U.S. Patent No. 7,369,772 (Jul. 2, 2009).
U.S. Pat. No. 6,134,047 Annotated Figure 7, Attached as Exhibit J-1 of Request for Inter Partes Reexamination of U.S. Patent No. 7,369,772 (Jul. 2, 2009).
Fiber Optic Textbook Annotated Figure 11-12, Attached as Exhibit K-1 of Request for Inter Partes Reexamination of U.S. Patent No. 7,369,772 (Jul. 2, 2009).
Fiber Optics Textbook Annotated Figure 11-12, Attached as Exhibit K-2 of Request for Inter Partes Reexamination of U.S. Patent No. 7,369,772 (Jul. 2, 2009).
Fiber Optics Textbook Annotated Figure 11-12, Attached as Exhibit K-3 of Request for Inter Partes Reexamination of U.S. Patent No. 7,369,772 (Jul. 2, 2009).
Fujitsu Limited's and Fujitsu Network Communications, Inc.'s Motion for Leave to File Amended Preliminary Invalidity Contentions, *Fujitsu Limited and Fujitsu Network Communications, Inc.*, Civil Action No. 08 CV 3379, May 4, 2009.
Defendants Fujitsu Limited's and Fujitsu Network Communications, Inc.'s Preliminary Invalidity Contentions, Amended, *Fujitsu Limited and Fujitsu Network Communications, Inc.*, Civil Action No. 08 CV 3379.
Fujitsu's Preliminary Invalidity Contentions for the '772 Patent-Amended Exhibit A3, U.S. Pat. No. 6,169,616, *Fujitsu Limited and Fujitsu Network Communications, Inc.*, Civil Action No. 08 CV 3379, Feb. 27, 2009.
Fujitsu's Preliminary Invalidity Contentions for the '772 Patent-Amended Exhibit A9, The Caenegem reference, *Fujitsu Limited and Fujitsu Network Communications, Inc.*, Civil Action No. 08 CV 3379, Feb. 27, 2009.

(56) References Cited

OTHER PUBLICATIONS

Kaminow et al., *Chapter 10: Undersea Amplified Lightwave System Design*, Optical Fiber Telecommunications IIIA, Academic Press, pp. 302-335 and 464-489 (1997).
Nishio, *Photonic Wavelength-Division Switching Network Using a Parallel λ-Switch*, pp. 286-288 and Figs. 2&3.
"Optical Networking: Lucent Technologies Announces Optical Transponder Module in Miniature Package for High-Speed Optical Networking Systems—Product Announcement," Edge, On & About AT&T, Mar. 8, 1999, pp. 1 and 2.
Baroni et al, "Analysis and Design of Backbone Architecture Alternatives for IP Optical Networking," IEEE Journal on Selected Areas in Communications, vol. 18, No. 10, Oct. 2000, pp. 1980-1994.
Batchellor, "Optical Networking the Ericsson Way," OADM Workshop, Scheveningen/The Hague, Carlton Beach Hotel, Apr. 1998, pp. 1-4.
Chen et al., "Metro Optical Networking," Bell Labs Technical Journal, Jan.-Mar. 1999, pp. 163-486.
Chung et al., "All-Optical Gain-Clamped EDFAs with Different Feedback Wavelengths for Use in Multiwavelength Optical Networks," Electronics Letters, vol. 32, No. 23, Nov. 7, 1996, p. 2159.
Complaint for Patent Infringement, *Tellabs Operations, Inc., v. Fujitsu Limited and Fujitsu Network Communications, Inc.*, Civil Action No. 08 CV 3379, Docket No. 1, Jun. 11, 2008, pp. 1-20.
Counterclaim Defendant Tellabs, Inc.'s Amended Answer and Counterclaims against Defendant Fujitsu Limited, *Tellabs Operations, Inc., v. Fujitsu Limited and Fujitsu Network Communications, Inc.*, Civil Action No. 08 CV 3379, Docket No. 121, Apr. 2, 2009, pp. 1-40.
Decision Granting-In-Part Petition Under 37 C.F.R. 1.181 and 37 C.F.R. 1.515(c), Ex Parte Reexamination of U.S. Patent No. 7,369,772, Reexamination Control No. 90/010,763, Feb. 3, 2011, pp. 1-12.
Declaration of Kim A. Winick in Support of Tellabs, Inc.'s, Tellabs Operation Inc.'s, and Tellabs North America's Responsive Claim Construction Brief (with Ex. 1 and Ex. 2), *Tellabs Operations, Inc., v. Fujitsu Limited and Fujitsu Network Communications, Inc.*, Civil Action No. 08 CV 3379, Docket No. 322-5, Jul. 20, 2010, pp. 1-68.
Declaration of Mark Dodd (with Ex. 1 through Ex. 12), *Tellabs Operations, Inc. v. Fujitsu Limited and Fujitsu Network Communications, Inc.*, Civil Action No. 08 CV 3379, Docket No. 322-1, Jul. 20, 2010, pp. 1-240.
Fujitsu Limited's and Fujitsu Network Communications, Inc.'s Opening Claim Construction Brief Addressing Claim Terms of Tellabs' Patent No. 7,369,772 (Confidential Version Filed Under Seal), *Tellabs Operations, Inc. v. Fujitsu Limited and Fujitsu Network Communications, Inc.*, Civil Action No. 08 CV 3379, Docket No. 298, Jun. 15 2010, pp. 1-78.
Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298, Jun. 15, 2010, pp. 1-78.
Defendant Fujitsu Limited's Answer and Affirmative Defenses to Plaintiff's Complaint and Defendant Fujitsu Limited's Counterclaims Against Plaintiff and Tellabs, Inc. and Demand for Jury Trial, *Tellabs Operations, Inc. v. Fujitsu Limited and Fujitsu Network Communications, Inc.*, Civil Action No. 08 CV 3379, Docket No. 61, Sep. 5, 2008, pp. 1-16.
Desurvire, "Erbium-Doped Fiber Amplifiers," Wiley-Interscience, 1994, pp. xx, xxii, 307, and 469-480.
Eaves et al., "An Overview of Emerging ITU-T Recommendations for the Synchronous Digital Hierarchy: Rates and Formats, Network Elements, Line Systems, and Network Aspects," SDH/SONET: A Sourcebook of Synchronous Networking, Siller, Jr. & Shafi, eds., IEEE Press, 1996, pp. 39-46.
Eaves, "Overhead Implementation Alternatives," Lightwave Online, Jan. 31, 1999, pp. 1-2.
"Newton's Telecom Dictionary," Telecom Library Inc., 1991, pp. 125, 126, 162, and 498.

"Optical Communication Products Launches OC-48 Optical Transponder Product Family," Business Editors, Dec. 20, 2000, 2 pages.
"Optical Communication Technology Presentation for the '772 Patent," *Tellabs Operations, Inc. v. Fujitsu Limited and Fujitsu Network Communications, Inc.*, Civil Action No. 08 CV 3379, Docket No. 213, 58 pages.
"Optical Communication Technology Presentation Overview," *Tellabs Operations, Inc. v. Fujitsu Limited and Fujitsu Network Communications, Inc.*, Civil Action No. 08 CV 3379, Docket No. 212, 50 pages.
"Optical Networking: Lucent Technologies Announces Optical Transponder Module in Miniature Package for High-Speed Optical Networking Systems—Product Announcement," EDGE, On & About AT&T, Mar. 8, 1999 2 pages.
"Supplemental Optical Communication Technology Presentation for the '772 Patent," *Tellabs Operations, Inc. v. Fujitsu Limited and Fujitsu Network Communications, Inc.*, Civil Action No. 08 CV 3379, Docket No. 271, Feb. 18, 2010, 34 pages.
"The New IEEE Standard Dictionary of Electrical and Electronics Terms," IEEE, 1993, pp. 62, 64, 260, 263, and 547.
Action Closing Prosecution (with reference) in Inter Partes Reexamination of U.S. Patent No. 7,369,772, Reexamination Control No. 95/000,485, Jun. 24, 2010, 150 pages.
Alferness et al., "MONET: New Jersey Demonstration Network Results", OFC '97 Technical Digest, pp. 152.
Alferness et al., "Optical Networking—How are We Doing?", IEEE, 0-7803-3895-2/97, 1997.
Alferness, "Multiwavelength Optical Network Activities in the US", 22nd European Conference on Optical Communication, Oslo, 1996.
Amendment After Allowance and Statement of Substance of Interview in U.S. Appl. No. 10/737,765, filed Jan. 11, 2008, 15 pages.
Amendment and Response to Office Action in Inter Partes Reexamination of U.S. Patent No. 7,369,772, Reexamination Control No. 95/000,485, Nov. 25, 2009, 11 pages.
Amendment and Terminal Disclaimer in U.S. Appl. No. 11/776,994, filed Jul. 9, 2010, 22 pages.
Amendment in U.S. Appl. No. 09/293,775, filed May 30, 2003, 20 pages.
Amendment in U.S. Appl. No. 10/737,765, filed Sep. 10, 2007, 23 pages.
Amendment in U.S. Appl. No. 11/319,338, filed Mar. 11, 2009, 15 pages.
Amendment in U.S. Appl. No. 11/697,513, filed Apr. 21, 2010, 59 pages.
Amendment in U.S. Appl. No. 11/697,527, filed Apr. 21, 2010, 26 pages.
Amendment in U.S. Appl. No. 11/697,527, filed Sep. 15, 2010, 4 pages.
Bae et al., "Fast Power Transient Management for OC-192 WDM Add/Drop Networks," IEEE Journal of Solid-State Circuits, vol. 43, No. 12, Dec. 2008, pp. 2958-2966.
Blumental, "Optical Network Elements", OFC '98 Technical Digest, pp. 57-58.
Brackett, "Optical Networking Activities in the United States", 22nd European Conference on Optical Communication, Oslo, 1996.
Comments by Third Party Requester After Patent Owner's Response in Inter Partes Reexamination of U.S. Patent No. 7,369,772, Reexamination Control No. 95/000,485, Dec. 28, 2009, 180 pages.
Comments by Third Party Requester After Patent Owner's Response in Inter Partes Reexamination of U.S. Patent No. 7,369,772, Reexamination Control No. 95/000,485, Jan. 4, 2010, 180 pages.
Dai et al., "Field Deployment and Evaluation of 1510 nm Data Communication Network for MONET Washington DC Network Trial", WK4-1, pp. 187-189.
Defendant Fujitsu Limited's Second Amended Answer and Affirmative Defenses to Plaintiffs Complaint and Defendant Fujitsu Limited's Second Amended Counterclaims Against Plaintiff, Tellabs, Inc. and Tellabs North America, Inc. and Demand for Jury Trial, *Tellabs Operations, Inc., v. Fujitsu Limited and Fujitsu Network Communications, Inc.*, Civil Action No. 08 CV 3379, Docket No. 386, Apr. 26, 2011, 69 pages.
Defendant Fujitsu Limited's Third Amended Answer and Affirmative Defenses to Plaintiff's Complaint and Defendant Fujitsu Limited's

(56) References Cited

OTHER PUBLICATIONS

Third Amended Counterclaims Against Plaintiff, Tellabs, Inc. and Tellabs North America, Inc. and Demand for Jury Trial, *Tellabs Operations, Inc., v. Fujitsu Limited and Fujitsu Network Communications, Inc.*, Civil Action No. 08 CV 3379, Docket No. 395, May 12, 2011, 69 pages.

Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc., v. Fujitsu Limited and Fujitsu Network Communications, Inc.*, Civil Action No. 08 CV 3379, Docket No. 387, Apr. 26, 2011, 64 pages.

Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc., v. Fujitsu Limited and Fujitsu Network Communications, Inc.*, Civil Action No. 08 CV 3379, Docket No. 396, May 12, 2011, 64 pages.

Earnshaw, "Planar Lightwave Circuit Based Reconfigurable Optical Add-Drop Multiplexer Architectures and reusable Subsystem Module, IEEE Journal of Selected Topics in Quantum Electronics", vol. 11, No. 2, Mar./Apr. 2005, pp. 313-322.

Ellinas et al., "Architecture Considerations in Merging Multi-Vendor WDM Rings for the MONET Washington D.C. Network", WK5-1, pp. 190-192.

Emmett, "Fiber Exhaust Spreads from Long-Distance Market—Wave Division Technology Laps at Local Stores," InternetWeek, Manhasset, Issue 709, Apr. 6, 1998, 4 pages.

Errata Sheet for Transcript of Ornan Gerstel Deposition held on May 13, 2010, 1 page.

European Office Action dated May 3, 2011, in counterpart European Application No. 07 796 705.7-2415.

European Search Report dated Nov. 29, 2010, in European Application No. 07 796 705.7-2415, 5 pages.

Ex Parte Quayle Action in U.S. Appl. No 11/697,527, Dec. 3, 2010, 4 pages.

Examiner's Answer in the Inter Partes Reexamination of U.S. Patent No. 7,369,772, Reexamination Control No. 95/000,485, Feb. 28, 2011, 3 pages.

Exhibit 1 through Exhibit 8 of Counterclaim Defendant Tellabs, Inc.'s Amended Answer and Counterclaims Against Defendant Fujitsu Limited, *Tellabs Operations, Inc. v. Fujitsu Limited and Fujitsu Network Communications, Inc.*, Civil Action No. 08 CV 3379, Docket No. 121-1 through 121-8, Apr. 2, 2009, 183 pages.

Exhibit 1 through Exhibit 8 of Plaintiff Tellabs, Operations Inc.'s Amended Counterclaims and Reply to Counterclaims Against Defendant Fujitsu Limited, *Tellabs Operations, Inc. v. Fujitsu Limited and Fujitsu Network Communications, Inc.*, Civil Action No. 08 CV 3379, Docket No. 122-1 through 122-8, Apr. 2, 2009, 183 pages.

Exhibit 13 through Exhibit 23 of Declaration of Mark Dodd, *Tellabs Operations, Inc. v. Fujitsu Limited and Fujitsu Network Communications, Inc.*, Civil Action No. 08 CV 3379, Docket No. 322-2, Jul. 20, 2010, 173 pages.

Exhibit 18 of Declaration of Mark Dodd (Filed Under Seal), *Tellabd Operations, Inc. v. Fujitsu Limited and Fujitsu Network Communications, Inc.*, Civil Action No. 08 CV 3379, Docket No. 323-1, Jul. 20, 2010, 29 pages.

Exhibit 210 of Ornan Gerstel Redacted Deposition conducted on May 13, 2010, *Tellabs Operations, Inc. v. Fujitsu Limited and Fujitsu Network Communications, Inc.*, Civil Action No. 08 CV 3379, 13 pages.

Exhibit 211 of Ornan Gerstel Redacted Deposition conducted on May 13, 2010, *Tellabs Operations, Inc. v. Fujitsu Limited and Fujitsu Network Communications, Inc.*, Civil Action No. 08 CV 3379, 3 pages.

Exhibit 212 of Ornan Gerstel Redacted Deposition conducted on May 13, 2010, *Tellabs Operations, Inc. v. Fujitsu Limited and Fujitsu Network Communications, Inc.*, Civil Action No. 08 CV 3379, 13 pages.

Exhibit 213 of Ornan Gerstel Redacted Deposition conducted on May 13, 2010, *Tellabs Operation, Inc. v. Fujitsu Limited and Fujitsu Newtwork Communications, Inc.*, Civil Action No. 08 CV 3379, 7 pages.

Exhibit 214 of Ornan Gerstel Redacted Deposition conducted on May 13, 2010, *Tellabs Operations, Inc. v. Fujitsu Limited and Fujitsu Network Communications, Inc.*, Civil Action No. 08 CV 3379, 7 pages.

Exhibit 23 through Exhibit 34 of Declaration of Mark Dodd, *Tellabs Operations, Inc. v. Fujitsu Limited and Fujitsu Network Communications, Inc.*, Civil Action No. 08 CV 3379, Docket No. 322-3, Jul. 20, 2010, 105 pages.

Exhibit 27 of Declaration of Mark Dodd (Filed Under Seal), *Tellabs Operations, Inc. v. Fujitsu Limited and Fujitsu Network Communications, Inc.*, Civil Action No, 08 CV 3379, Docket No. 323-2, Jul. 20, 2010, 10 pages.

Exhibit 3 through Exhibit 5 of Declaration of Kim A. Winick, *Tellabs Operations, Inc. v. Fujitsu Limited and Fujitsu Network Communications, Inc.*, Civil Action No. 08 CV 3379, Docket No. 322-6, Jul. 20, 2010, 61 pages.

Exhibit 35 through Exhibit 42 of Declaration of Mark Dodd, *Tellabs Operations, Inc. v. Fujitsu Limited and Fujitsu Network Communications, Inc.*, Civil Action No. 08 CV 3379, Docket No. 322-4, Jul. 20, 2010, 98 pages.

Exhibit 43 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 5 pages.

Exhibit 44 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 32 pages.

Exhibit 45 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 14 pages.

Exhibit 46 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379 18 pages.

Exhibit 47 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 24 pages.

Exhibit 48 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3779, 25 pages.

Exhibit 49 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 35 pages.

Exhibit 50 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 26 pages.

Exhibit 51 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 36 pages.

Exhibit 52 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 250 pages.

Exhibit 53 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 13 pages.

(56) References Cited

OTHER PUBLICATIONS

Exhibit 54 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 3 pages.
Exhibit 55 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 3 pages.
Exhibit 56 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 4 pages.
Exhibit 57 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 4 pages.
Exhibit 58 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 3 pages.
Exhibit 59 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 10 pages.
Exhibit 60 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 21 pages.
Exhibit 61 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 25 pages.
Exhibit 63 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 7 pages.
Exhibit 64 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 11 pages.
Exhibit 66 of Redacted Deposition of Rajiv Ramaswami, Ph.D. conducted on Jul. 10, 2009, *Tellabs Operations, Inc. v. Fujitsu Limited and Fujitsu Network Communications, Inc.*, Civil Action No. 08 CV 3379, 111 pages.
Exhibit A of Tellabs Operations, Inc. and Tellabs, Inc., and Tellabs North America, Inc.'s Submission of Extrinsic Evidence for Claim Construction, *Tellabs Operations, Inc. v. Fujitsu Limited and Fujitsu Network Communications, Inc.*, Civil Action No, 08 CV 3379, Docket No. 153exA, Jun. 16, 2009, 18 pages.
Exhibit A of Tellabs' Proposed Terms for Claim Construction and Supporting Intrinsic Evidence, *Tellabs Operations, Inc. v. Fujitsu Limited and Fujitsu Network Communications, Inc.*, Civil Action No. 08 CV 3379, Docket No. 89exA, Dec. 22, 2008, 8 pages.
Exhibit A through Exhibit R of Defendant Fujitsu Network Communications, Inc.'s Amended Answer and Affirmative Defenses to Plaintiff's Complaint and Defendant Fujitsu Network Communications, Inc.'s Amended Counterclaims Against Plaintiff, *Tellabs Operations, Inc. v. Fujitsu Limited and Fujitsu Network Communications, Inc.*, Civil Action No. 08 CV 3379, Docket No. 120A through 120R, Apr. 1, 2009, 414 pages.
Exhibit A through Exhibit T of Defendant Fujitsu Limited's Amended Answer and Affirmative Defenses to Plaintiff's Complaint and Defendant Fujitsu Limited's Amended Counterclaims Against Plaintiff, Tellabs, Inc. and Tellabs North America, Inc., *Tellabs Operations, Inc. v. Fujitsu Limited and Fujitsu Network Communications, Inc.*, Civil Action No. 08 CV 3379, Docket No. 119A through 119T, Apr. 1, 2009, 490 pages.
Exhibit A1 through Exhibit A20 of Tellabs Operations, Inc. and Tellabs, Inc., and Tellabs North America, Inc's Submission of Extrinsic Evidence for Claim Construction, *Tellabs Operations, Inc. v. Fujitsu Limited and Fujitsu Network Communications, Inc.*, Civil Action No. 08 CV 3379, Docket No. 153exA1 through 153exA20, Jun. 16, 2009, 157 pages.
Exhibit A-1 through Exhibit A-4 of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-1, Jun. 15, 2010, 86 pages.
Exhibit A-5 through Exhibit B-4 of Defendant Fujitsu Limited's and Fujitsu Network Communications, Inc.'s Opening Claim Construction Brief Addressing Claim Terms of Tellabs' Patent No, 7,369,772, *Tellabs Operations, Inc. v. Fujitsu Limited and Fujitsu Network Communications, Inc.*, Civil Action No. 08 CV 3379, Docket No. 298-2, Jun. 15, 2010, 208 pages.
Exhibit B of Fujitsu Limited and Fujitsu Network Communications, Inc.'s Supplemental Preliminary Rebuttal Claim Construction Submission Based Only on Intrinsic Evidence, *Tellabs Operations, Inc. v. Fujitsu Limited and Fujitsu Network Communications, Inc.*, Civil Action No. 08 CV 3379, Docket No. 127exB, Apr. 10, 2009, 42 pages.
Exhibit B of Tellabs Operations, Inc.'s First Supplemental Preliminary Infringement Contentions, *Tellabs Operations, Inc. v. Fujitsu Limited and Fujitsu Network Communications, Inc.*, Civil Action No. 08 CV 3379, Jun. 4, 2009, 194 pages.
Exhibit B of Tellabs' Response to Fujitsu Limited and Fujitsu Network Communications, Inc.'s Preliminary Claim Constructions Based on Intrinsic Evidence Submitted Dec. 22, 2008, *Tellabs Operations, Inc. v. Fujitsu Limited and Fujitsu Network Communications, Inc.*, Civil Action No. 08 CV 3379, Docket No. 91exB, Jan. 15, 2009, 4 pages.
Exhibit B of Tellabs' Proposed Terms for Claim Construction and Supporting Intrinsic Evidence, *Tellabs Operations, Inc. v. Fujitsu Limited and Fujitsu Network Communications, Inc.*, Civil Action No. 08 CV 3379, Docket No. 89exB, Dec. 22, 2008, 5 pages.
Exhibit B-11 of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-4, Jun. 15, 2010, 71 pages.
Exhibit B-12 through Exhibit B-14 of Defendatn Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-5, Jun. 15, 2010, 61 pages.
Exhibit B-15 (cont'd) through Exhibit B-19 of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-7, Jun. 15, 2010, 68 pages.
Exhibit B-15 of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-6, Jun. 15, 2010, 17 pages.
Exhibit B-18 (Table of Contents Redaction) of Defendant Fujitsu Limited's and Fujitsu Network Communications, Inc.'s Opening Claim Construction Brief Addressing Claim Terms of Tellabs' Patent No. 7,369,772 (Filed Under Seal), *Tellabs Operations, Inc. v. Fujitsu Limited and Fujitsu Network Communications, Inc.*, Civil Action No. 08 CV 3379, Docket No. 298-7, Jun. 15, 2010, 17 pages.
Exhibit B-20 through Ex. B-25 of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-8, Jun. 15, 2010, 126 pages.

(56) References Cited

OTHER PUBLICATIONS

Exhibit B-26, B-29 through B-33, 835 through B-37, C-1 and C-2 of Fujitsu's Reply Brief Re Construction of Claim Terms in Tellabs' U.S. Patent No. 7,369,772, *Tellabs Operations, Inc. v. Fujitsu Limited and Fujitsu Network Communications, Inc.*, Civil Action No. 08 CV 3379, Docket No. 335-1, Aug. 10, 2010, 151 pages.
Exhibit B-27 of Fujitsu's Reply Brief Re Construction of Claim Terms in Tellabs' U.S. Patent No. 7,369,772 (Filed Under Seal), *Tellabs Operations, Inc. v. Fujitsu Limited and Fujitsu Network Communications, Inc.*, Civil Action No. 08 CV 3379, Docket No. 335-1, Aug. 10, 2010, 19 pages.
Exhibit B-34 (Table of Contents Redaction) of Fujitsu's Reply Brief Re Construction of Claim Terms in Tellabs' U.S. Patent No. 7,369,772 (Filed Under Seal), *Tellabs Operations, Inc. v. Fujitsu Limited and Fujitsu Network Communications, Inc.*, Civil Action No. 08 CV 3379, Docket No. 335-1, Aug. 10, 2010, 18 pages.
Exhibit B-5 (Table of Contents Redaction) of Defendant Fujitsu Limited's and Fujitsu Network Communications, Inc.'s Opening Claim Construction Brief Addressing Claim Terms of Tellabs' Patent No. 7,369,772 (Filed Under Seal), *Tellabs Operations, Inc. v. Fujitsu Limited and Fujitsu Network Communications, Inc.*, Civil Action No. 08 CV 3379, Docket No. 298-3, Jun. 15, 2010, 34 pages.
Exhibit B-5 through Exhibit B-10 of Defendatn Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-3, Jun. 15, 2010, 54 pages.
Exhibit C (With sub-exhibits) of Fujitsu Limited's and Fujitsu Network Communications, Inc.'s Preliminary Identification of Extrinsic Evidence for Claim Construction, *Tellabs Operations, Inc. v. Fujitsu Limited and Fujitsu Network Communications, Inc.*, Civil Action No. 08 CV 3379, Docket No. 166exC, Jun. 16, 2009, 245 pages.
Exhibit C of Defendant Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298-9, Jun. 15, 2010, 452 pages.
Exhibit C of Fujitsu Limited and Fujitsu Network Communications, Inc.'s Preliminary Claim Constructions Based Solely on Intrinsic Evidence, *Tellabs Operations, Inc. v. Fujitsu Limited and Fujitsu Network Communications, Inc.*, Civil Action No. 08 CV 3379, Docket No. 90exC, Dec. 22, 2008, 30 pages.
Exhibit C of Tellabs' Response to Fujitsu Limited and Fujitsu Network Communications, Inc.'s Preliminary Claim Constructions Based on Intrinsic Evidence Submitted Dec. 22, 2008, *Tellabs Operations, Inc. v. Fujitsu Limited and Fujitsu Network Communications, Inc.*, Civil Action No. 08 CV 3379, Docket No. 91exC, Jan. 15, 2009, 5 pages.
Exhibit CAO-A of Fujitsu Limited's Request for Ex Parte Reexamination of U.S. Patent No, 7,369,772, Reexamination Control No. 90/010,763, Fujitsu Limited, Dec. 9, 2009, 4 pages.
Exhibit CAO-B of Fujitsu Limited's Request for Ex Parte Reexamination of U.S. Patent No. 7,369,772, Reexamination Control No. 90/010,763, Fujitsu Limited, Dec. 9, 2009, 5 pages.
Exhibit CAO-C of Fujitsu Limited's Request For Ex Parte Reexamination of U.S. Patent No. 7,369,772, Reexamination Control No. 90/010,763m Fujitsu Limited, Dec. 9, 2009, 8 pages.
Exhibit CAO-D of Fujitsu Limited's Request for Ex Parte Reexamination of U.S. Patent No. 7,369,772, Reexamination Control No. 90/010,763, Fujitsu Limited, Dec. 9, 2009, 7 pages.
Exhibit CAO-E of Fujitsu Limited's Request for Ex Parte Reexamination of U.S. Patent No. 7,369,772, Reexamination Control No. 90/010,763, Fujitsu Limited, Dec. 9, 2009, 8 pages.
Exhibit CC-A of Fujitsu Limited's Request for Ex Parte Reexamination of U.S. Patent No. 7,369,772, Reexamination Control No. 90/010,763, Fujitsu Limited, Dec. 9, 2009, 100 pages.
Exhibit CC-B of Fujitsu Limited's Request for Ex Parte Reexamination of U.S. Patent No. 7,369 772 Reexamination Control No. 90/010 763 Fujitsu Limited, Dec. 9 2009 106 pages.
Exhibit DECL-A of Fujitsu Limited's Request For Ex Parte Reexamination of U.S. Patent No. 7,369,772, Reexamination Control No. 90/010,763, Alan E. Willner, Dec. 4, 2009, 94 pages.
Exhibit GREEN-A of Fujitsu Limited's Request for Ex Parte Reexamination of U.S. Patent No. 7,369,772, Reexamination Control No. 90/010,763, Fujitsu Limited, Dec. 9, 2009, 2 pages.
Exhibit GREEN-B of Fujitsu Limited's Request for Ex Parte Reexamination of U.S. Patent No. 7,369,772, Reexamination Control No. 90/010,763, Fujitsu Limited, Dec. 9, 2009, 5 pages.
Exhibit GREEN-C of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-D of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-E of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-F of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-G of Fujitsu Limited's Request for Ex Parte Reexamination of U.S. Patent No. 7,369,772, Reexamination Control No. 90/010,763, Fujitsu Limited, Dec. 9, 2009, 5 pages.
Exhibit GREEN-H of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-I of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit GREEN-J of Fujitsu Limited's Request for Ex Parte Reexamination of U.S. Patent No. 7,369,772, Reexamination Control No. 90/010,763, Fujitsu Limited, Dec. 9, 2009, 6 pages.
Exhibit PAT-B in Ex Parte Reexamination of U.S. Patent No. 7,369,772, Reexamination Control No. 90/010,763, Dec. 9, 2009, 17 pages.
Exhibit R (Part I of II) in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc., v. Fujitsu Limited and Fujitsu Network Communications, Inc.*, Civil Action No. 08 CV 3379, Docket No. 386-3, Apr. 26, 2011, 134 pages.
Exhibit R (Part I of II) in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc., v. Fujitsu Limited and Fujitsu Network Communications, Inc.*, Civil Action No. 08 CV 3379, Docket No. 395-3, May 12, 2011, 134 pages.
Exhibit R (Part I of II) in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc., v. Fujitsu Limited and Fujitsu Network Communications, Inc.*, Civil Action No. 08 CV 3379, Docket No. 387-3, Apr. 26, 2011, 134 pages.
Exhibit R (Part I of II) in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc., v. Fujitsu Limited and Fujitsu Network Communications, Inc.*, Civil Action No. 08 CV 3379, Docket No. 396-3, May 12, 2011, 134 pages.
Exhibit R (Part II of II) in Defendant Fujitsu Limited's Second Amended Answer and Affirmative Defenses to Plaintiffs Complaint and Defendant Fujitsu Limited's Second Amended Counterclaims Against Plaintiff, Tellabs, Inc. and Tellabs North America, Inc., *Tel-

(56) References Cited

OTHER PUBLICATIONS

*labs Operations, Inc.,* v. *Fujitsu Limited and Fujitsu Network Communications, Inc.,* Civil Action No. 08 CV 3379, Docket No. 386-4, Apr. 26, 2011, 73 pages.
Exhibit R (Part II of II) in Defendant Fujitsu Limited's Third Amended Answer and Affirmative Defenses to Plaintiffs Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395-4, May 12, 2011, 73 pages.
Exhibit R (Part II of II) in Defendant Fujitsu Network Communications, Inc.'s Second Amended Answer and Affirmative Defenses to Plaintiff's Complaint and Defendatn Fujitsu Network Communications, Inc.'s Second Amended Coutnerclaims Against Plaintiff and Demand for Jury Trial, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 387-4, Apr. 26, 2011, 73 pages.
Exhibit R (Part II of II) in Defendant Fujitsu Network Communications, Inc.'s Third Amended Answer and Affirmative Defenses to Plaintiff's Complaint and Defendent Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Acton No. 08 CV 3379, Docket No. 396-4, May 12, 2011, 73 pages.
Exhibits A through K in Defendant Fujitsu Limited's Second Amended Answer and Affirmative Defenses to Plaintiffs Complaint and Defendant Fujitsu Limited's Second Amended Counterclaims Against Plaintiff, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 386-1, Apr. 26, 2011, 118 pages.
Exhibits A through K in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, Tellabs Operations, Inc., v. *Fujitsu Limited and Fujitsu Network Communications, Inc.,* Civil Action No. 08 CV 3379, Docket No. 395-1, May 12, 2011, 118 pages.
Exhibits A through K in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 387-1, Apr. 26, 2011, 118 pages.
Exhibits A through K in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396-1, May 12, 2011, 118 pages.
Exhibits B-28 (Redaction on p. 19 of the PDF file) of Fujitsu's Reply Brief Re Construction of Claim Terms in Tellabs' U.S. Patent No. 7,369,772 (Filed Under Seal), *Tellabs Operations, Inc.* v. *Fujitsu Limited and Fujitsu Network Communications, Inc.,* Civil Action No. 08 CV 3379, Docket No. 335-1, Aug. 10, 2010, 19 pages.
Exhibits in Support of Fujitsu's Rebuttal Presentation for the '772 Patent, Dec. 3, 2010, 45 pages.
Exhibits L through Q in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 386-2, Apr. 26, 2011, 112 pages.

Exhibits L through Q in Defendant Fujitsu Network Communications, Inc.'s Second Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395-2, May 12, 2011, 112 pages.
Exhibits L through Q in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 387-2, Apr. 26, 2011, 112 pages.
Exhibits L through Q in Defendant Fujitsu Network Communications, Inc.'s Thrid Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396-2, May 12, 2011, 112 pages.
Exhibits S and T in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.,*v. *Fujitsu Limited and Fujitsu Network Communications, Inc.,* Civil Action No. 08 CV 3379, Docket No. 386-5, Apr. 26, 2011, 54 pages.
Exhibits S and T in Defendant Fujitsu Limited's Third Amended Answer and Affirmative Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395-5, May 12, 2011, 54 pages.
Final Office Action in U.S. Appl. No. 11/776,994, Sep. 29, 2010, 44 pages.
Ford et al., "MEMS Wavelength Add/Drop Switch," Lucent Technologies Bell Labs Innovations, 11 pages.
Ford et al., "Wavelength Add/Drop Switching Using Tilting Micromirrors," Journal of Lightwave Technologies, vol. 17, No. 5, May 1999, pp. 904-911.
Ford et al., "Wavelength-Selectable Add/Drop With Tilting Micromirrors," LEOS, Nov. 10-13, 1997, 3 pages.
Fujitsu Limited and Fujitsu Network Communications, Inc.'s Preliminary Claim Constructions Based Only on Intrinsic Evidence, *Tellabs Operations, Inc.* v. *Fujitsu Limited and Fujitsu Network Communications, Inc.,* Civil Action No. 08 CV 3379, Docket No. 90, Dec. 22, 2008, 4 pages.
Fujitsu Limited and Fujitsu Network Communications, Inc.'s Preliminary Rebuttal Claim Construction Submission Based Only on Intrinsic Evidence, *Tellabs Operations, Inc.* v. *Fujitsu Limited and Fujitsu Network Communications, Inc.,* Civil Action No. 08 CV 3379, Docket No, 92, Jan. 15, 2009, 6 pages.
Fujitsu Limited and Fujitsu Network Communications, Inc.'s Supplemental Preliminary Rebuttal Claim Construction Submission Based Only on Intrinsic Evidence, *Tellabs Operations, Inc.* v. *Fujitsu Limited and Fujitsu Network Communications, Inc.,* Civil Action No. 08 CV 3379, Docket No. 127, Apr. 10, 2009, 6 pages.
Fujitsu Limited's Request for Ex Parte Reexamination of U.S, Patent No. 7,369,772, Reexamination Control No. 90/010,763, Fujitsu Limited, Dec. 9, 2009, 118 pages.
Fujitsu Limited's and Fujitsu Network Communications, Inc.'s Motion for Leave to File Amended Preliminary Invalidity Contentions, *Tellabs Operations, Inc.* v. *Fujitsu Limited and Fujitsu Network Communications, Inc.,* Civil Action No. 08 CV 3379, Docket No. 137, May 4, 2009, 6 pages.
Fujitsu Limited's and Fujitsu Network Communications, Inc.'s Preliminary Identification of Extrinsic Evidence for Claim Construction,

(56) References Cited

OTHER PUBLICATIONS

*Tellabs Operations, Inc. v. Fujitsu Limited and Fujitsu Network Communications, Inc.,* Civil Action No. 08 CV 3379, Docket No. 166, Jun. 16, 2009, 5 pages.
Fujitsu's Proposed Claim Constructions for the Parties' May 12, 2010 Exchange, *Tellabs Operations, Inc. v. Fujitsu Limited and Fujitsu Network Communications, Inc.,* Civil Action No, 08 CV 3379, 10 pages.
Fujitsu's Rebuttal Markman Presentation for U.S. Patent No. 7,369,772, Dec. 3, 2010, 98 pages.
Fujitsu's Reply Brief Re Construction of Claim Terms in Tellabs' U.S. Patent No. 7,369,772 (Confidential Version Filed Under Seal), *Tellabs Operations, Inc. v. Fujitsu Limited and Fujitsu Network Communications, Inc.,* Civil Action No. 08 CV 3379, Docket No. 335, Aug. 10, 2010, 70 pages.
Fujitsu's Surrebuttal Markman Slides for U.S. Patent No. 7,369,772, Dec. 7, 2010, 36 pages.
Fujitsu's Preliminary Invalidity Contentions for the '772 Patent-AMENDED Exhibit A3, U.S. Pat. No. 6,169,616, *Tellabs Operations, Inc. v. Fujitsu Limited and Fujitsu Network Communications, Inc., Inc.,* Civil Action No. 08 CV 3379, May 4, 2009, 47 pages.
Garrett et al., "The MONET New Jersey Network Demonstration", IEEE Journal on Selected Area in Communications, vol. 16, No. 7, Sep. 1998, pp. 1199-1219.
Gerla et al., "Multilevel Optical Networks", IEEE, 1992, pp. 1168-1172.
Gerstel et al., "Making Use of a Two Stage Multiplexing Scheme in a WDM Network," 2000, pp. 44-46.
Glance, "Tunable Add/Drop Optical Filter Providing Arbitrary Channel Arrangements", IEE Photonics Technology Letters, vol. 7, No. 11, Nov. 1995, pp. 1303-1305.
Goodman et al., "Critical Issues in Multiwavelength Optical Networking".
Goodman et al.. "The Multiwavelength Optical Networking Program (MONET)", IEEE, 0-7803-3682-8/96, 1996, pp. 120-124.
Gottlieb et al., "MONET WDM Network Elements," IEEE Mil. Comm. Conf. Proc., Oct./Nov. 1999, pp. 963-967.
Hayee et al., "Transmission Penalties Due to EDFA Gain Transients in Add-Drop Multiplexed WDM Networks," IEEE Photonics Technology Letters, vol. 11, No. 7, Jul. 1999, pp. 889-891.
Hecht, "Long-Haul DWDM Systems Go the Distance," Laser Focus World, Oct. 2000, pp. 125-132.
Hecht, "Planned Super-Internet Banks on Wavelength-Division Multiplexing," Laser Focus World, May 1998, pp. 103-105.
Hecht, "Wavelength Division Multiplexing," Technology Review, 1999, pp. 73-77.
Henry, "Lightwave Primer," IEEE Journal of Quantum Electronics, vol. QE-21, No. 12, Dec. 1985, pp. 1862-1879.
Heywood, "The Optical Future", Light Reading, Mar. 29, 2000, printed from www.lightreading.com on Nov. 9, 2000.
Hill et al., "A Transport Network Layer Based on Optical Network Elements," Journal of Lightwave Technology, vol. 11, No. 5/6, May/Jun. 1993, pp. 667-679.
Iler, "Mirrors, Bubbles Lead Race to Pure Optical Switching", Sep. 2000, printed from www.cedmagazine.com/ced/009019003.htm on Nov. 9, 2000.
International Preliminary Report on Patentability and Written Opinion of PCT/US2007/015541, 9 pages.
International Search Report of PCT/US2002/005826, 4 pages.
International Search Report of PCT/US2007/015541, 7 pages.
Interview Summary in U.S. Appl. No. 11/776,994, filed Mar. 25, 2011, 3 pages.
Jackel, "Experiments on the MONET DC Network", IEEE, 0-7803-5634-9/99, 1999.
Jerominek et al., "Optical Branching Effect in Ti:LiNbO3 Waveguides: Near-Field Pattern Studies," Applied Optics, vol. 25, 1986, pp. 732-736.
Johnson et al, "Advanced Optical Networking—Lucent's MONET Network Elements", Bell Labs Technical Journal, Jan.-Mar. 1999, pp. 145-162.

Lee et al., "Enabling Optoelectronic Technologies for Optical Networking".
Lehmen, "Large-Scale Demonstration of Multi-Wavelength Optical Networking in MONET Washington, DC Network", ThP4-1, pp. 237.
Letter Transmitting Corrected Drawings in U.S. Appl. No. 09/293,775, May 21, 2003, 9 pages.
Letter Transmitting Corrected Drawings in U.S. Appl. No. 09/293,775, Nov. 25, 2003, 8 pages.
Lin et al., "Micro-Electro-Mechanical Systems (MEMS) for WDM Optical-Crossconnect Networks", IEEE, 0-7803-5538-5/99, 1999, pp. 954-957.
Lin et al , "Micromachined Optical-Switching Technologies or WDM Networks," IEEE LEOS Summer Topical Meetings, Jul. 1999, pp. 57-58.
Liu et al', "A Management and Visualization Framework for Reconfigurable WDM Optical Networks", IEEE Network, 0890-8044/00, pp. 8-15, Nov./Dec. 2000.
McGraw-Hill Dictionary of Scientific and Technical Terms, McGraw-Hill, 1989, pp. 144, 152, 425, and 780.
Memorandum Opinion and Order Preliminarily Construing Certain Disputed Claim Terms Based on the Intrinsic Evidence, *Tellabs Operations, Inc. v. Fujitsu Limited and Fujitsu Network Communications, Inc.,* Civil Action No. 08 CV 3379, Docket No. 145, May 13, 2009, 40 pages.
Murphy, "Lithium Niobate Switch Arrays for Optical Cross-connects".
Nishio, "Photonic Wavelength-Division Switching Network Using a Parallel [lambda]—Switch," Apr. 1990, pp. 286-288 and Figs. 2&3.
Non-final Office Action in Inter Partes Reexaminationa of U.S. Patent No. 7,369,772, Reexamination Control No. 95/000,485, Sep. 25, 2009, 96 pages.
Non-final Office Action in Reexamination Control No. 90/009,864, Apr. 28, 2011, 16 pages.
Non-final Office Action in U.S. Appl. No. 09/293,775, May 21, 2002, 7 pages.
Non-final Office Action in U.S. Appl. No. 09/293,775, Nov. 21, 2002, 10 pages.
Non-final Office Action in U.S. Appl. No. 10/737,765, Mar. 8, 2007, 10 pages.
Non-final Office Action in U.S. Appl. No. 11/319,338, Dec. 12, 2008, 9 pages.
Non-final Office Action in U.S. Appl. No. 11/697,513, Dec. 29, 2009, 9 pages.
Non-final Office Action in U.S. Appl. No. 11/697,513, Jul. 8, 2010, 12 pages.
fi Non-nal Office Action in U.S. Appl. No. 11/697,527, Apr. 13, 2011, 12 pages.
Non-final Office Action in U.S. Appl. No. 11/697,527, Dec. 29, 2009, 10 pages.
213 Non-final Office Action in U.S. Appl. No. 11/697,527, Jul. 8, 2010, 20 pages.
Non-final Office Action in U.S. Appl. No. 11/776,994, Apr. 12, 2010, 38 pages.
Notice of Allowance in U.S. Appl. No. 10/737,765, Nov. 29, 2007, 11 pages.
Notice of Allowance/Allowability in U.S. Appl. No. 09/293,775, Aug. 26, 2003, 8 pages.
Notice of Allowance/Allowability in U.S. Appl. No. 09/293,775, Jun. 29, 2004, 3 pages.
Notice of Appeal to the Board of Patent Appeals and Interferences from the Examiner's Decision Confirming Claims in the Reexamination of U.S. Patent No. 7,369,772, Reexamination Control No. 95/000,485, Sep. 10, 2010, 4 pages.
Office Action in EP Patent Application No. 07 796 705.7, Nov. 29, 2010, 5 pages.
Okamoto et al., "Optical Path Cross-Connect Node Architectures for Photonic Transport Network", Journal of Lightwave Technology, vol. 14, No. 6, Jun. 1996.
Order Denying Request for Ex Parte Reexamination, Fujitsu Limited's Request for Ex Parte Reexamination of U.S. Patent No. 7,369,772, Reexamination Control No. 90/010,763, USPTO, Mar. 1, 2010, 13 pages.

(56) References Cited

OTHER PUBLICATIONS

Order Granting Request for Ex Parte Reexamination of U.S. Patent No. 6,973,229, Reexamination Control No. 90/009,864, Feb. 14, 2011, 16 pages.
Order Granting Request for Inter Partes Reexamination of U.S. Patent No, 7,369,772, Reexamination Control No. 95/000,485, Sep. 25, 2009, 16 pages.
Pacer Docket Report of *Tellabs Operations, Inc.* v. *Fujitsu Limited and Fujitsu Network Communications, Inc.*, Civil Action No. 08 CV 3379, Retrieved May 3, 2012, 114 pages.
Patent Owner's Respondent Brief in the Inter Partes Reexamination of U.S. Patent No. 7,369,772, Reexamination Control No. 95/000,485, Dec. 10, 2010, 81 pages.
Patent Owner's Respondent Brief in the Inter Partes Reexamination of U.S. Patent No. 7,369,772, Reexamination Control No. 95/000,485, Feb. 9, 2011, 66 pages.
Petition to Grant Request For Ex Parte Reexamination Under 37 C.F.R. 1.515(c) and 1.181, Fujitsu Limited's Request For Ex Parte Reexamination of U.S. Patent No. 7,369,772, Reexamination Control No. 90/010,763, Fujitsu Limited, Mar. 31, 2010, 31 pages.
Plaintiff Tellabs, Operations Inc.'s Amended Counterclaims and Reply to Counterclaims Against Defendant Fujitsu Limited, *Tellabs Operations, Inc.* v. *Fujitsu Limited and Fujitsu Network Communications, Inc.*, Civil Action No. 08 CV 3379, Docket No. 122, Apr. 2, 2009, 41 pages.
Preliminary Amendment in U.S. Appl. No. 09/293,775, Aug. 21, 2002, 6 pages.
Preliminary Amendment in U.S. Appl. No. 10/737,765, Dec. 17, 2003, 6 pages.
Preliminary Amendment in U.S. Appl. No. 10/737,765, Jul. 13, 2004, 8 pages.
Presentation by Tellabs for the Claim Construction Hearing for U.S. Patent No. 7,369,772, Nov. 24, 2010, 218 pages.
Ramaswami, "Optical Networking," presentation slides, pp. 1-111.
Rectified Comments by Third Party Requester After Patent Owner's Response in Inter Partes Reexamination of U.S. Patent No. 7,369,772, Reexamination Control No. 95/000,485, Mar, 17, 2010, 47 pages.
Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 300 pages.
Redacted Transcript of Ornan Gerstel Deposition conducted on May 13, 2010, *Tellabs Operations, Inc.* v. *Fujitsu Limited and Fujitsu Network Communications, Inc.*, Civil Action No. 08 CV 3379, 249 pages.
Request For Ex Parte Reexamination of U.S. Patent No. 6,973,229, Reexamination Control No. 90/009,864, Dec. 23, 2010, 321 pages.
Response to Ex Parte Quayle Action in U.S. Appl. No. 11/697,527, Feb. 2, 2011, 20 pages.
Response to Notice of Non-compliant Amendment in U.S. Appl. No. 10/737,765, Aug. 2, 2004, 6 pages.
Response to Rule 312 Communication in U.S. Appl. No. 10/737,765, Jan. 31, 2008, 3 pages.
Right of Appeal Notice in Inter Partes Reexamination of U.S. Patent No. 7,369,772, Reexamination Control No. 95/000,485, Aug. 21, 2010, 8 pages.
Saleh, "Optical Networking and the MONET Project", IEEE, 0-8189-7852-6/97, 1997.
Saleh, "Overview of the MONET, Multiwavelength Optical Networking, Program", OFC '96 Technical Digest, pp. 240.
Saleh, "Review of the MONET Project", CLEO/PACIFIC RIM, pp. 12.
Sincerbox et al., "Small Fast Large-Aperture Light Modulator Using Attenuated Total Reflection," Applied Optics, vol. 20, No. 8, Apr. 15, 1981, pp. 1491 and 1492.
Singer, "An MLSE Receiver for Electronic Dispersion Compensation of OC-192 Fiber Links," IEEE Journal of Solid-State Circuits, vol. 41, No. 11, Nov. 2006, pp. 2541-2554.
Singer, "Electronic Dispersion Compensation," IEEE Signal Processing Magazine, Nov. 2008, pp. 110-130.
Soole, "Optical Monitoring in WDM Networks", IEEE, 0-7803-3895-2/97, 1997.
Srinivasan, "Multiwavelength Cross-Connect Technology", IEEE, 0-7803-3895-2/97, 1997.
Srinivasan, "Photonic Switching Inside the MONET Cross Connect", CLEO '97, pp. 206.
Statement of Substance of Interview in U.S. Appl. No. 11/776,994, filed Mar, 29, 2011, 2 pages.
Sugaya et al., "Study of Configuration Methods of Multi-Wavelengh Er-doped Fiber Amplifiers," The Institute of Electronics, Information and Communication Engineers Technical Report of IEICE OCS95-36, 1995, pp. 1-23 (including translation).
Tellabs Operations, Inc. and Tellabs, Inc., and Tellabs North America, Inc.'s Submission of Extrinsic Evidence for Claim Construction, *Tellabs Operations, Inc.* v. *Fujitsu Limited and Fujitsu Network Communications, Inc.*, Civil Action No. 08 CV 3379, Docket No. 153, Jun. 16, 2009, 9 pages.
Tellabs' Operations, Inc., Tellabs, Inc., and Tellabs North America, Inc.'s Responsive Brief ob Clamin Construction, *Tellabs Operations, Inc.* v. *Fujitsu Limited and Fujitsu Network Communications, Inc.*, Civil Action No. 08 CV 3379, Docket No. 322, Jul. 20, 2010. 84 pages.
Tellabs, Titan 6100 Optical Transport System, Module and Hardware Description, Technical Manual 76.6100/4, Rev. A, p. 4-31 (2000).
Tellabs Operations, Inc.'s Disclosure of Asserted Claims and Infringement Contentions (with Exhibit A), *Tellabs Operation, Inc.* v. *Fujitsu Limited and Fujitsu Network Communications, Inc.*, Civil Action No. 08 CV 3379, Nov. 4, 2008, 210 pages.
Tellabs Operations, Inc.'s First Supplemental Preliminary Infringement Contentions, *Tellabs Operations, Inc.* v. *Fujitsu Limited and Fujitsu Network Communications, Inc.*, Civil Action No, 08 CV 3379, Jun. 4, 2009, 5 pages.
Tellabs Proposed Claim Constructions—May 12, 2010 Exchange with Fujitsu, *Tellabs Operations, Inc.* v. *Fujitsu Limited and Fujitsu Network Communications, Inc.*, Civil Action No. 08 CV 3379, 4 pages.
Tellabs' Response to Fujitsu Limited and Fujitsu Network Communications, Inc.'s Preliminary Claim Constructions Based on intrinsic Evidence Submitted Dec. 22, 2008, *Tellabs Operations, Inc.* v. *Fujitsu Limited and Fujitsu Network Communications, Inc.*, Civil Action No. 08 CV 3379, Docket No. 91, Jan. 15, 2009, 5 pages.
Tellabs' Responsive Brief on Claim Construction (Filed Under Seal), *Tellabs Operations, Inc.* v. *Fujitsu Limited and Fujitsu Network Communications, Inc.*, Civil Action No. 08 CV 3379, Docket No. 323, Jul. 20, 2010, 84 pages.
Tellabs' Proposed Terms for Claim Construction and Supporting Intrinsic Evidence, *Tellabs Operations, Inc.,* v. *Fujitsu Limited and Fujitsu Network Communications, Inc.,* Civil Action No. 08 CV 3379, Docket No. 89, Dec, 22, 2008, 3 pages.
Tellabs' Supplemental Exhibits for Rebuttal Regarding the Claim Construction Argument for U.S. Patent No. 7,369,772, Dec. 3, 2010, 30 pages.
Third Party Requester's Appeal Brief to the Board of Patent Appeals and Interferences in the Inter Partes Reexamination of U.S. Patent No. 7,369,772, Reexamination Control No, 95/000,485, Jan. 10, 2011, 115 pages.
Third Party Requester's Appeal Brief to the Board of Patent Appeals and Interferences in the Inter Partes Reexamination of U.S. Patent No. 7,369,772, Reexamination Control No, 95/000,485, Nov. 10, 2010, 122 pages.
Third Party Requester's Rebuttal Brief to the Board of Patent Appeals and Interferences in the Inter Partes Reexamination of U.S. Patent No. 7,369,772, Reexamination Control No. 95/000,485, Mar. 28, 2011 17 pages.
Tkach, "National Scale Optical Networking: The MONET Long-Distance Testbed".
Transcript of Proceedings Held on Feb. 22, 2010, *Tellabs Operations, Inc.* v. *Fujitsu Limited and Fujitsu Network Communications, Inc.*, Civil Action No. 08 CV 3379, Docket No. 286, Feb. 22, 2010, 122 pages.

(56) References Cited

OTHER PUBLICATIONS

Wagner et al., "Realizing the Vision of Multiwavelength Optical Networking", ECOC, Conference Publication, No. 448, Sep. 22-25, 1997, pp. 143-147.

Wagner, "Overview of Multiwavelength Optical Networking (MONET) Program".

Wei et al., "Connection Management for Multiwavelength Optical Networking", IEEE Journal on Selected Areas in Communications, vol. 16, No. 7, Sep. 1998, pp. 1097-1108.

Wei et al., "Network Control and Management of a Reconfigurable WDM Network", IEEE, 0-7803-3682-8/96, 1996, pp. 581-586.

Weik, "Fiber Optics Standard Dictionary," Chapman & Hall, 1997, pp. 209, 617-618, and 1058.

Willner et at, "Passive Equalization of Nonuniform EDFA Gain by Optical Filtering for Megameter Transmission of 20 WDM Channels Through a Cascade of EDFA's," IEEE Photonics Technology Letters, vol. 5, No. 9, Sep. 1993, 4 pages.

Willner, "Optical Communications Tutorial for Judge Holderman," *Tellabs Operations, Inc. v. Fujitsu Limited and Fujitsu Network Communications, Inc.*, Civil Action No. 08 CV 3379, Docket No. 204, Aug. 27, 2009, 60 pages.

Willner, "Review of Fujitsu's Tutorial and Claim Construction for the '772 Patent," *Tellabs Operations, Inc. v. Fujitsu Limited and Fujitsu Network Communications, Inc.*, Civil Action No. 08 CV 3379, Docket No. 262, Feb. 18, 2010, 19 pages.

Wilson et al., "Multiwavelength Optical Networking Management and Control", Journal of Lightwave Technology, vol. 18, No. 12, Dec. 2000.

Wolter, "Optical 'Access' Rides the Waves", Jun. 2000, printed from www.x-changemag.com/articels/061spot.html in Nov. 22, 2000.

Xin et al , "Transport of Gigabit Ethernet Directly Over WDM for 1062 km in the MONET Washington DC Network", IEEE, 0-7803-6252-7/00, 2000.

Janniello et al., "A Prototype Circuit-Switched Multi-Wavelength Optical Metropolitan-Area Network", Journal of Lightwave Technology, vol. 11, No. 5/6, May/Jun. 1993, pp. 777-782.

Gambini et al, "Transparent Optical Packet Switching: Network Architecture and Demonstrators in the KEOPS Project", IEEE Journal on Selected Areas in Communications, vol. 16, No. 7, Sep. 1998, pp. 1245-1259.

Karasan and Ayanoglu, "Performance of WDM Transport Networks", IEEE, 37 pages.

Modiano and Barr, "Architectural Considerations in the design of WDM-based Optical Access Networks", Computer Networks and ISDN Systems, Feb. 1999, 27 pages.

Mukherjee, "WDM Optical Communication Networks: Progress and Challenges", IEEE Journal on Selected Areas in Communications, vol. 18, No. 10, Oct. 2000, pp. 1810-1824.

Wei and McFarland, "Just-In-Time Signaling for WDM Optical Burst Switching Networks", Journal of Lightwave Technology, vol. 18, No. 12, Dec. 2000, pp. 2019-2037.

Kuznetsov et al, "A Next-Generation Optical Regional Access Network", IEEE Communications Magazine, Jan. 2000, pp. 66-72.

Bregni et al, "State of the Art of Optical Switching Technology for All-Optical Networks", Communications World, WSES Press, 2001, 4 pages.

Kartalopoulos, "Part IV—Dense Wavelength Division Multiplexing. Chapter 16: DWDM Topologies", Introduction to DWDM Technology, Data in a Rainbow, IEEE Press, 2000, pp. 197-207.

Simmons and Saleh, "Optical Regional Access Network (ORAN) Project", OFC'99, Feb. 21-26, 1999, San Diego, CA, 3 pages.

Chan at al., "Architectures and Technologies for High-Speed Optical Data Networks", Journal of Lightwave Technology, vol. 16, No. 12, Dec. 1998, pp. 2146-2168.

Sadot and Boimovich, "Tunable Optical Filters for Dense WDM Networks", IEEE Communications Magazine, Dec. 1998, pp. 50-55.

Khorshidahmad and Kirk, "Multi-wavelength Generation via a Heterostructure Cavity Embedded in a Photonic Crystal Ring", IEEE Photonics Society, Nov. 7-11, 2010, pp. 413-414.

Besse et al, "New 2x2 and 1x3 Multimode Interference Couplers with Free Selection of Power Splitting Ratios", Journal of Lightwave Technology, vol. 14, No. 10, Oct. 1996, pp. 2286-2293.

Alvarez et al., "Design and Implementation of a Beam-Waveguide Mirror Control System for Vernier Pointing of the DSS-13 Antenna", TDA Progress Report 42-117, May 15, 1994, pp. 49- 61.

Brenci et al , "Hollow Waveguides for Long-Wavelength I.R. Radiation", Optical Waveguide Sciences, 1983, pp. 165-172.

Söchtig "Ti: LiNbO3 Stripe Waveguide Bragg Reflector Gratings", Electronic Letters, vol. 24, No. 14, Jul. 7, 1988, pp. 844-845.

Karmel at al., "Special Antenna Configurations", Introduction to Electromagenetic and Microwave Engineering, 1998, pp. 665-673.

Saleh and Teich, "Guided-Wave Optics", Fundamentals of Photonics, 1991, pp. 238-271.

Lorbeck and Vernon, "High-Power Gaussian-Beam Reflector Waveguide for Use with a Gyrotron Quasi-Optical Mode Converter", IEEE, 1994, pp. 1940-1943.

Guenther, "Reflection from a Conductor", Modern Optics, 1990, pp. 83-84.

Thumm et al., "Quasi-Optical Mode Converters in Advanced High-Power Gyrotrons for Nuclear Fusion Plasma Heating", vol. 203, 2005, pp. 325-351.

Hardy and Perrin, "The Principles of Optics", 5th Edition, 1932, pp. 22-25.

Jenkins and White, "Fundamentals of Optics", 3rd Editions, 1957, pp. 520-533.

Ponchak et al., "Finite Ground Coplanar Waveguide Shunt MEMS Switches for Switched Line Phase Shifters", 30th European Microwave Conference Proceedings, Oct. 3-5, 2000, pp. 252-255.

Tischer and Potukuchi, "Waves Guided Between Open Parallel Concave Reflectors", IEEE Transactions on Microwave Theory and Techniques, Jul. 1974, pp. 742-743.

"Waveguide Tutorial—Introduction", Optical Waveguides: Numerical Modeling, http://optical-waveguides-modeling.net/tutorial-introduction.jsp, last accessed Nov. 14, 2011, 2 pages.

Matthews and Mickelson, "Analysi of an Integrated Optical Coherent Receiver with Optical State of Polarization Control", Fiber and Integrated Optics, vol. 10, 1991, pp. 137-165.

Golnabi, "Design and construction of a high-precision computer-controlled monochromator", Review of Scientific Instruments, vol. 65, 1997, pp. 2798-2801.

International Search Report and the Written Opinion of the International Searching Authority, or the Declaration, PCT/US2007/062348, Jul. 4, 2007.

"The Role of Buffer Management in Controlling the Effects of Congestion over 10 GbE Links," White Paper, Force10 Networks, Inc., 2006.

"Integrated Services Digital Network (ISDN)—Architectural Framework and Service Description for Frame-Relaying Bearer Service," ANSI, 1990.

"Traffic Management Specification Version 4.1," The ATM Forum, John Kenney, ed., Mar. 1999.

Goyal et al., "Start-time Fair Queuing: A Scheduling Algorithm for Integrated Services Packet Switching Networks," Proceedings Sigcomm '96.

Shreedhar et al, "Efficient Fair Queuing using Deficit Round Robin," Proceedings Sigcomm '95, Cambridge MA, p. 231-242, 1995.

Wang, "Traffic Management in Packet-Switched Core Networks," Tellabs, Jul. 2003.

Heinanen et al., "Assured Forwarding PHB Group," The Internet Society, Jun. 1999.

"Addendum to Traffic Management V4.1 for an Optional Minimum Desired Cell Rate Indication for UBR," The ATM Forum, Jul. 2000.

Gonzales, "Multiservice Switching Forum Contribution", WorldCom, 2002.

Complaint for Patent Infringement, *Lambda Optical Solutions, LLC, v. Alcatel-Lucent SA, et al.*, Civil Action No. 10 CV 00487, Docket No, 1, Jun. 4, 2010, pp. 1-10.

Defendants Alcatel-Lucents USA Inc. and Alcatel-Lucent Holdings Inc.'s Answer, Affirmative Defenses, and Counterclaims, *Lambda Optica Solutions, LLC v. Alcatel-Lucents SA et al., Alcatel-Lucent USA Inc. et al. v. Lambda Optical Solutions, LLC et al.*, Civil Action No. 10 CV 00487, Docket No. 74, Jan. 24, 2011, pp. 1-26.

(56) References Cited

OTHER PUBLICATIONS

International Preliminary Report on Patentability, PCT/US2007/062348, dated Sep. 2, 2008.
Plaintiff Tellabs Operations, Inc.'s Answer to the Third Amended Counterclaims of Fujitsu Network Communications, Inc., *Tellabs v. Fujitsu Limited and Fujitsu Network Communications, Inc.,* Civil Action No. 08 CV 3379, Docket No, 406, May 26, 2011, 50 pages.
Plaintiff Tellabs Operations, Inc.'s Answer to the Third Amended Counterclaims of Fujitsu Limited and Counterclaims Against Defendant Fujitsu Limited, *Tellabs Operations, Inc.,* v. *Fujitsu Limited and Fujitsu Network Communications, Inc.,* Civil Action No. 08 CV 3379, Docket No. 407, May 26, 2011, 87 pages.
Counterclaim Defendant Tellabs, Inc.'s Answer to Fujitsu Limited's Third Amended Counterclaims and Counterclaims Against Defendant Fujitsu Limited, *Tellabs Operations, Inc.* v. *Fujitsu Limited and Fujitsu Network Communications, Inc.,* Civil Action No. 08 CV 3379, Docket No. 408, May 26, 2011, 42 pages.
Counterclaim Defendant Tellabs North America's Answer to Fujitsu Limited's Third Amended Counterclaims and Counterclaims Against Defendant Fujitsu Limited, *Tellabs Operations, Inc.* v. *Fujitsu Limited and Fujitsu Network Communications, Inc.,* Civil Action No. 08 CV 3379, Docket No. 409, May 26, 2011, 42 pages.
Memorandum Opinion and Order, *Fujitsu Limited* v. *Tellabs Operations, Inc., and Tellabs, Inc.,* Civil Action No. 08 CV 3379, Docket No. 427, Sep. 29, 2011, 89 pages.
Corrected Exhibit 3 of Declaration of Benjamin B. Kelly, *Tellabs Operations, Inc.* v. *Fujitsu Limited and Fujitsu Network Communications, Inc.,* Civil Action No. 08 CV 3379, Docket No. 434, Oct. 28, 2011, 5 pages.
Fujitsu's Response to Tellabs' Motion for Reconsideration of the Court's Markman Claim Construction Order for U.S. Patent No. 7,369,772, *Fujitsu Limited* v. *Tellabs Operations, Inc., and Tellabs, Inc.,* Civil Action No. 08 CV 3379, Docket No. 437, Nov. 17, 2011, 25 pages.
Plaintiff Tellabs Operations, Inc.'s Reply in Support of its Motion for Reconsideration, *Tellabs Operations, Inc.* v. *Fujitsu Limited and Fujitsu Network Communications, Inc.,* Civil Action No. 08 CV 3379, Docket No. 439, Dec. 6, 2011, 16 pages.
Declaration of Kelley A. Conaty in Support of Plaintiff Tellabs Operations, Inc.s' Reply in Support of its Motion for Reconsideration, *Tellabs Operations, Inc.* v. *Fujitsu Limited and Fujitsu Network Communications, Inc.,* Civil Action No. 08 CV 3379, Docket No. 439-1, Dec. 8, 2011, 96 pages.
Fujitsu Limited's and Fujitsu Network Communications, Inc.'s Surreply in Opposition to Tellab's Motion for Reconsideration, *Fujitsu Limited* v. *Tellabs Operations, Inc., and Tellabs, Inc.,* Civil Action No. 08 CV 3379, Docket No. 443, Dec. 21, 2011, 10 pages.
Fujitsu Limited's and Fujitsu Network Communications, Inc.'s Response to Tellab's Motion to Sever and Stay Claims of the '772 Patent, *Fujitsu Limited* v. *Tellabs Operations, Inc., and Tellabs, Inc.,* Civil Action No. 08 CV 3379, Docket No. 459, Jan. 31, 2012, 23 pages.
Plaintiff Tellabs Operations, Inc.'s Reply in Support of its Motion to Sever and Stay Claims Involving the '772 Patent, *Tellabs Operations, Inc.* v. *Fujitsu Limited and Fujitsu Network Communications, Inc.,* Civil Action No. 08 CV 3379, Docket No. 462, Feb. 7, 2012, 11 pages.
Memorandum Opinion and Order, *Fujitsu Limited* v. *Tellabs Operations, Inc. and Tellabs, Inc.,* Civil Action No. 08 CV 3379, Docket No. 479, Mar. 31, 2012, 18 pages.
Christophe Chauvet, European Search Report in Application No. 07 796 705,7-2415, Mar. 5, 2011, p. 3-5.
Amendment in U.S. Appl. No. 11/697,527, Aug. 15, 2011, 27 pages.
Final Office Action of Oct. 25, 2011 in U.S. Appl. No. 11/697,527, 17 pages.
Amendment in U.S. Appl. No. 11/697,527, Jan. 24, 2012, 25 pages.
Amendment in U.S. Appl. No. 11/776,994, May 31, 2011, 24 pages.
Non-Final Office Action of Jul. 19, 2012 in U.S. Appl. No. 11/776,994, 41 pages.
Applicant-Initiated Interview Summary in U.S. Appl. No. 11/776,994, Oct. 16, 2012, 3 pages.
Amendment in U.S. Appl. No. 11/776,994, Oct. 18, 2012, 28 pages.
Notice of Allowance in U.S. Appl. No. 11/776,994, Dec. 21, 2012, 19 pages.
Examiner-Initiated Interview Summary in U.S. Appl. No. 11/776,994, Dec. 21, 2012, 1 page.
Notices of Allowance in U.S. Appl. No. 11/776,994, Jan. 16, 2013, 16 pages.
Notice of Allowance in U.S. Appl. No. 11/776,994, Feb. 6, 2013, 16 pages.
Decision on Appeal to the Board of Patent Appeals and Interferences in the Inter Partes Reexamination of U.S. Patent No. 7,369,772, Reexamination Control No. 95/000,495, Dec. 12, 2011, 26 pages.
Record of Oral Before the Board of Patent Appeals and Interferences in the Inter Partes Reexamination of U.S. Patent No. 7,369,772, Reexamination Control No. 95/000,495, Dec. 15, 2011, 41 pages.
Amendment under 37 C.F.R. 41.77(b) in the Inter Partes Reexamination of U.S. Patent No. 7,369,772, Reexamination Control No. 95/000,495, Jan. 17, 2012, 47 pages.
Third Party Requester's Response to Patent Owner's Submission Pursuant to 37 C.F.R. 41.77(c) in the Inter Partes Reexamination of U.S. Patent No. 7,369,772, Reexamination Control No. 95/000,495, Feb. 13, 2012, 139 pages.
Examiner's Determination Under 37 Cfr 41.77 in the Inter Partes Reexamination of U.S. Patent No. 7,369,772, Reexamination Control No. 95/000,495, Mar. 26, 2012, 6 pages.
Patent Owner Comments Under 37 C.F.R. 41.77(e) in the Inter Partes Reexamination of U.S. Patent No. 7,369,772, Reexaminationa Control No. 95/000,495, May 1, 2012, 55 pages.
Third Party Requester's Response to Patent Owner's Submission Pursuant to 37 C.F.R. 41.77(e) in the Inter Partes Reexamination of U.S. Patent No. 7,369,772, Reexamination Control No. 95/000,495, May 29, 2012, 15 pages.
Decision on Appeal to the Board of Patent Appeals and Interferences in the Inter Partes Reexamination of U.S. Patent No, 7,369,772, Reexamination Control No. 95/000,495, Jan. 9, 2013, 15 pages.
Notice of Intent to Issue Ex Parte Reexamination Certificate in Ex Parte Reexamination of U.S. Patent No. 7,362,772, Reexamination Control No. 90/010,763, May 27, 2011, 6 pages.
Ex Parte Reexamination Certificate, U.S. Patent No. 7,362,772 C1, Aug. 9, 2011, 14 pages.
Ho et al., "Performance of an Eight-wavelength Bidirectional WDM Add/Drop Multiplexer with 80-Gbit/s Capacity," OCF 97, Feb. 16-21, 1997, pp. 90-91.
(Strebel and) Caspar et al., "4x2.5 Gbit/s, NRZ Transmission Experiments Over Transparent Crossconnects with Optoelectronic Frequency Converters and Dispersion Compensated Standard Singlemode Fiber Links", Proceedings of 1998 3rd Optoelectronics and Comm. Conference, IEICE Trans. Commun., E82-B/8, p. 1127-1130 (1999).
Ramaswami et al., Optical Networks: A Practical Perspective 2nd Edition, Academic Press (2002), Complete Book.

\* cited by examiner

OPTICAL LINE TERMINAL ARRANGEMENT, APPARATUS AND METHODS

CROSS-REFERENCE TO RELATED APPLICATIONS

This application is a continuation of application Ser. No. 10/737,765, filed Dec. 18, 2003, now U.S. Pat. No. 7,369,772, which is a division of application Ser. No. 09/293,775, filed Apr. 19, 1999, now U.S. Pat. No. 6,721,508, issued Apr. 13, 2004, which claims the benefit of U.S. Provisional Application No. 60/112,510, filed Dec. 14, 1998.

FIELD OF THE INVENTION

The invention is in the field of optical telecommunications, and more particularly, pertains to upgrading an in-service wavelength division multiplexed (WDM) optical communication system including a pair of optical line terminals (OLTs) that reside in the same office and are part of separate WDM networks to form an all optical pass-through from the line side of one OLT of the pair to the line side of the other OLT of the pair.

BACKGROUND OF THE INVENTION

Wavelength division multiplexing (WDM) is an approach for increasing the capacity of existing fiber optic networks. A WDM system employs plural optical signal channels, each channel being assigned a particular channel wavelength. In a WDM system optical signal channels are generated, multiplexed to form an optical signal comprised of the individual optical signal channels, transmitted over a single waveguide, and demultiplexed such that each channel wavelength is individually routed to a designated receiver.

SUMMARY OF THE INVENTION

In typical wavelength division multiplexing systems all wavelengths are constrained to pass through from a source optical node to a predetermined sink optical node.

In view of the above it is an aspect of the invention to selectively pass-through, add or drop individual wavelengths at selected optical nodes.

It is another aspect of the invention to utilize optical line terminals having all-optical pass-through interfaces that provide for continued transmission of optical signals without any intervening electro-optical conversion, and to connect two optical line terminals back-to-back at their respective pass-through interfaces to provide an optical path from the line side interface of the first optical line terminal to the line side interface of the second optical line terminal.

It is yet another aspect of the invention to utilize optical line terminals having a multiplexer/demultiplexer including one or more stages for inputting/outputting individual wavelengths or bands of a predetermined number of wavelengths, or a combination of bands and individual wavelengths.

It is a further aspect of the invention to utilize the optical line terminals to support complex mesh network structures while permitting growth of an in-service network without disrupting network service.

It is yet a further aspect of the invention to provide a wavelength division multiplexed optical communication system including a plurality of optical line terminals, each having a line interface and an all-optical pass-through interface including a plurality of pass-through optical ports and each also including a plurality of local optical ports and an optical multiplexer/demultiplexer for multiplexing/demultiplexing transmitted/received wavelengths. The optical multiplexer/demultiplexer may include one or more stages for inputting/outputting individual wavelengths or bands of a predetermined number of wavelengths, or a combination of bands and individual wavelengths, with at least one of the pass-through optical ports of one of the optical line terminals being connected to at least one of the pass-through optical ports of another optical line terminal to form an optical path from the line side interface of the one of the optical line terminals to the line side interface of the another optical line terminal.

These and other aspects and advantages of the invention will be apparent to those of skill in the art from the following detailed description.

DETAILED DESCRIPTION

Figure 1:
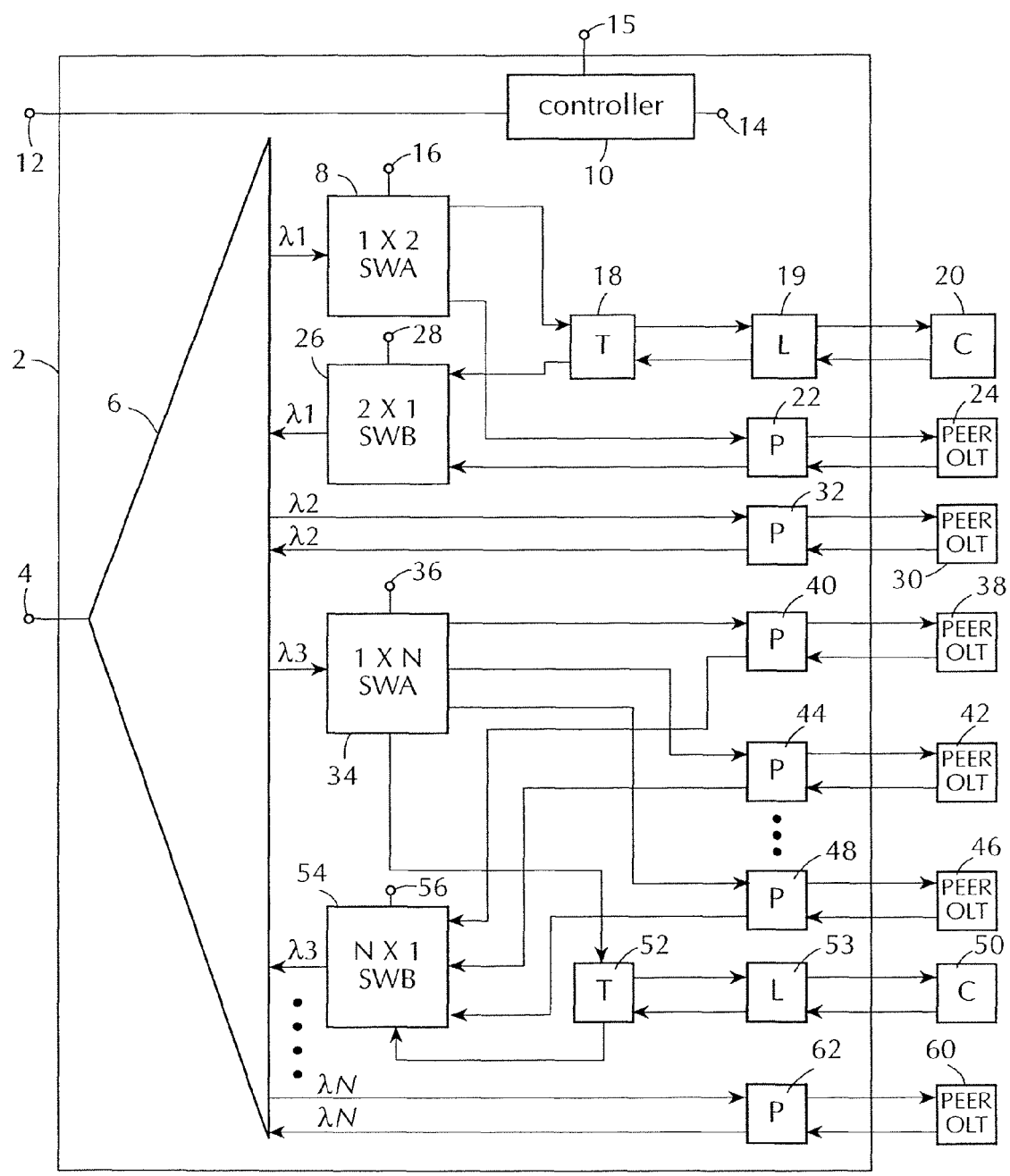
FIG. 1 is a block diagram of an optical line terminal.

FIG. 1 is a block diagram of an optical line terminal (OLT) 2 which is the basic element of the present embodiment. The OLT 2 has an input/output line interface 4 which is connected to an external fiber facility and transmits/receives an optical signal having N optical wavelengths, for example 32 wavelengths, on a single optical fiber which is multiplexed/demultiplexed by a multiplexer/demultiplexer 6, which outputs demultiplexed wavelengths $\lambda1$-$\lambda N$ on individual optical fibers. The respective wavelengths $\lambda1$-$\lambda N$ are sent either to a peer OLT via a pass-through port or to client equipment via a transponder and a local port. The client equipment includes SONET equipment, add/drop multiplexers, cross-connect switches, internet protocol (IP) routers, asynchronous transfer mode switches (ATM) and the like.

As employed herein an optical signal is generally intended to encompass wavelengths in the range of approximately 300 nanometers to approximately 2000 nanometers (UV to far IR). This range of wavelengths can be accommodated by the preferred type of optical conductor (a fiber optic), which typically operates in the range of approximately 800 nanometers to approximately 1600 nanometers.

Consider $\lambda1$ which is provided to a 1×2 switch 8 which is controlled by a control signal, having at least N states, from a controller 10. The controller 10 responds to a command, from a management system (not shown), at a terminal 12 to provide the control signal at a terminal 14 and then to control terminal 16 of switch 8 to position the switch 8 in a first or second position. When in the first position, $\lambda1$ is provided to a transponder 18 which transmits $\lambda1$ to a client apparatus 20 via a local port 19. When in the second position λ1 is provided to a pass-through port 22 to a corresponding pass-through port in a peer OLT 24. The control signal is also provided to output terminal 15, and then to control terminal 16 of a corresponding switch 8 in peer OLT 24 to route λ1 to the corresponding multiplexer/demultiplexer 6. If it is desired to send λ1 to both client apparatus 20 and peer OLT 24, an optical splitter can be used in place of the switch 8.

Switch 26 selects λ1 coming from the opposite direction in response to a control signal at terminal 28 from controller 10 to position switch 26 in a first or second position. When in the first position, λ1 is received from client 20 via local port 19 and transponder 18, and when in the second position λ1 is received from peer OLT 24 via pass-through port 22, and then is provided to multiplexer/demultiplex 6 to be multiplexed with the other received wavelengths λ2-λN.

A wavelength can be directly passed-through to a peer OLT rather than being sent to a client apparatus. For example, λ2 is directly sent to, and received from, peer OLT 30 via pass-through port 32.

A 1×N switch can be used to send/receive a wavelength to/from one of N−1 peer OLTs or a client apparatus. For example, 1×N switch 34 under control of a control signal, having at least N states, provided to terminal 36 from controller 10 sends λ3 to either peer OLT 38 via pass-through port 40, or peer OLT 42 via pass-through port 44, or peer OLT 46 via pass-through port 48 or client apparatus 50 via transponder 52 and local port 53. Reception of λ3 in the opposite direction is controlled by N×1 switch 54 under control of a control signal provided to terminal 56 from controller 10, and than is provided to multiplexer/demultiplexer 6 to be multiplexed with the other received wavelengths.

As discussed above, a wavelength can be passed-through to a peer OLT via a pass-through port or can be optically switched to a client apparatus via a local port. λN is shown as being directly passed through to, or received from, peer OLT 60 via pass-through port 62.

Figure 2:
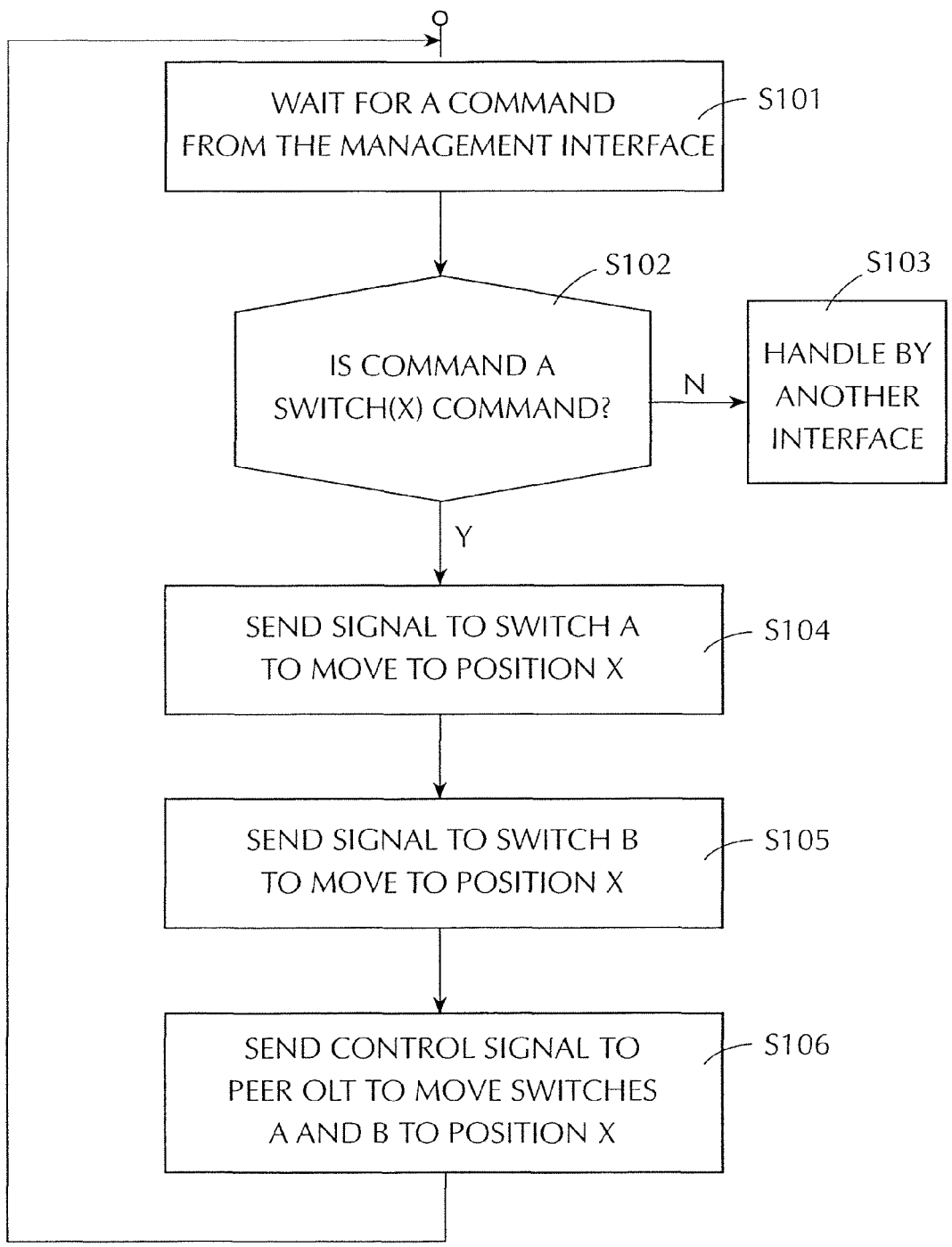
FIG. 2 is a flow chart of the control steps executed by the controller 10 of FIG. 1.

FIG. 2 is a flow chart of the steps performed by the controller 10 of FIG. 1 to control the 1×2 switches 8 and 26, and the 1×N switches 34 and 54 to route the respective wavelengths λ1-λN.

In step S101 the controller 10 waits for a command from a management system such as a computer (not shown). At step S102 a determination is made as to whether or not the command is a switch control signal to either pass-through the wavelength via a pass-through port to a peer OLT or drop/add the wavelength locally at/from a client apparatus via a transponder and a local port. If the answer is no, the command is handled by another interface (not shown) at step S103. If the answer is yes, a signal is sent to switch A (for example switch 8 or 34) to move switch A to transmit position X (the selected position) at step S104, and at S105 a signal is sent to switch B (for example switch 26 or 54) to move switch B to receive position X (the selected position). At step 106 the control signal at terminal 15 of controller 10 is sent to the peer OLT to set its switches A and B in a corresponding manner. A loop-back is then made to step S101 to wait for the next command.

In the multiplexer/demultiplexer 6 of FIG. 1, 32 wavelengths on a single optical fiber received at line interface 4 are demultiplexed into 32 individual wavelengths λ1-λ32. However, according to another aspect of the invention the 32 wavelengths can be demultiplexed into bands, for example four bands of 8 wavelengths each, by a first multiplexer, and the resultant four bands can be processed by the OLT. According to another aspect of the invention at least one of the four bands of wavelengths can be demultiplexed by a second multiplexer/demultiplexer into its individual wavelengths such that the OLT can process the individual wavelengths of the at least one band and the remaining ones of the four bands.

Figure 3:
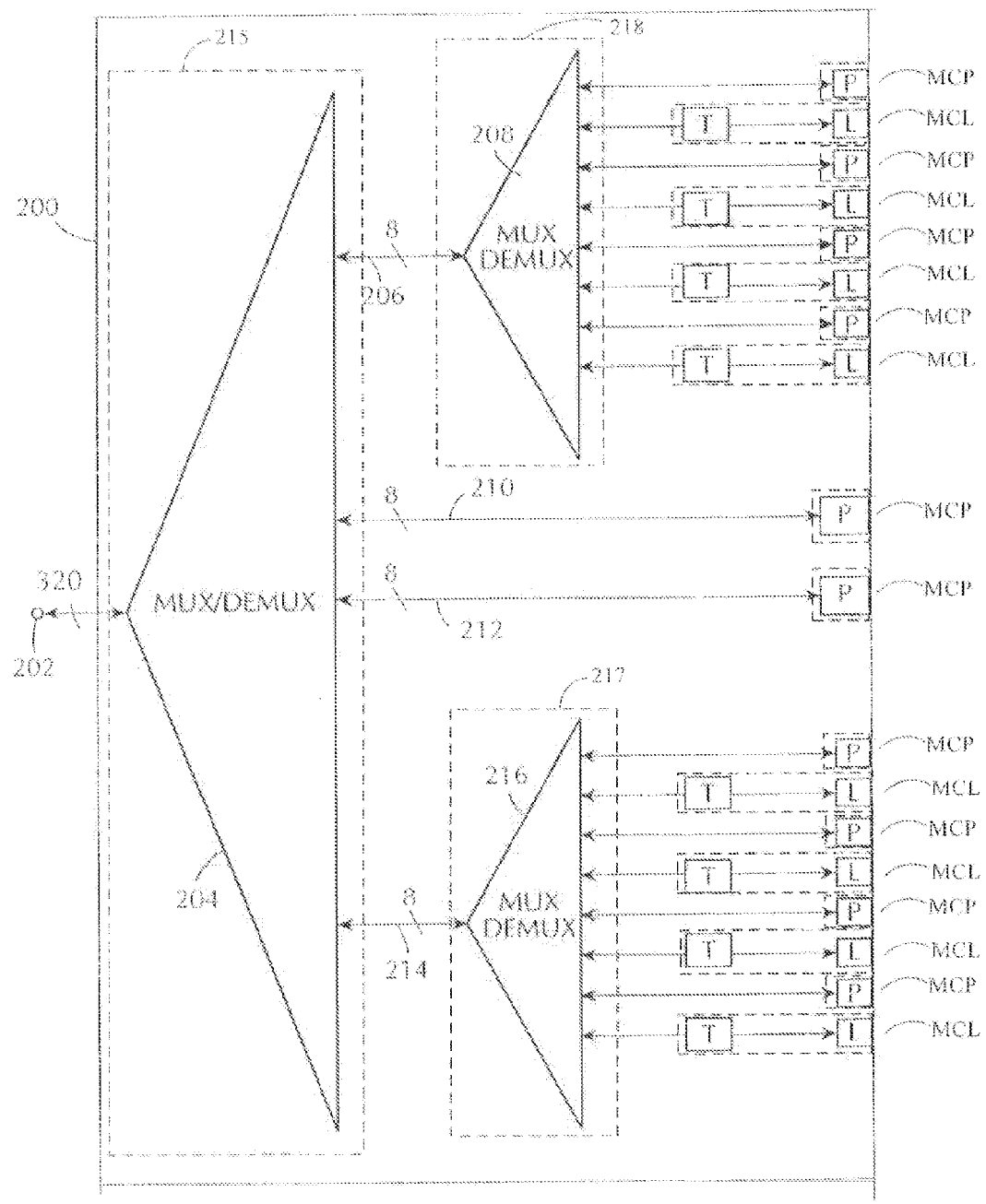
FIG. 3 is a block diagram of an optical line terminal having a two-stage multiplexer/demultiplexer.

FIG. 3 is a block diagram illustrating a modular OLT 200 having two stages of multiplexing/demultiplexing. The operation of the OLT 200 is described with respect to the demultiplexing operation; however, it is to be understood that the multiplexing is merely the reverse operation. It is to be noted that the 1×2 switches and 1×N switches shown in FIG. 1 are not included in FIG. 3 in order to simplify the drawing. However, it is to be understood that in practice such switches may be utilized in the practice of the invention. The OLT terminal 200 has an input/output line interface 202 which is connected to an external fiber facility and receives on a single optical fiber N, for example 32, wavelengths which are demultiplexed by a multiplexer/demultiplexer 204, which is situated on a first modular card 215, into M, for example 4, bands of 8 wavelengths each. The first band 206 (λ1-λ8) is demultiplexed into its 8 individual wavelengths by a multiplexer/demultiplexer 208, which is situated on a second modular card 218, with each such wavelength being provided to a pass-through port (P) or a local port (L) via transponder (T). Each of the pass-through ports (P) is situated on a different modular card (MCP), and each of the transponder (T) and its associated local port (L) are situated together on yet another modular card (MCL). Although direct connections are shown, as discussed above the respective wavelengths may be selectively switched to either of a local port (L) via transponder (T), or a pass-through port (P) as described with respect to FIG. 1. band 210 (λ9-λ16) is provided directly to a pass-through port (P), and the third band 212 (λ17-λ24) is provided directly to a pass-through port (P).

The fourth band 214 (λ25-λ32) is demultiplexed into its 8 individual wavelengths by a multiplexer/demultiplexer 216, which is situated on a modular card 217, with each such wavelength being provided to a pass-through port (P) or a local port (L) via a transponder (T). Again, switching may be used to select a connection to either P or T.

Figure 4:
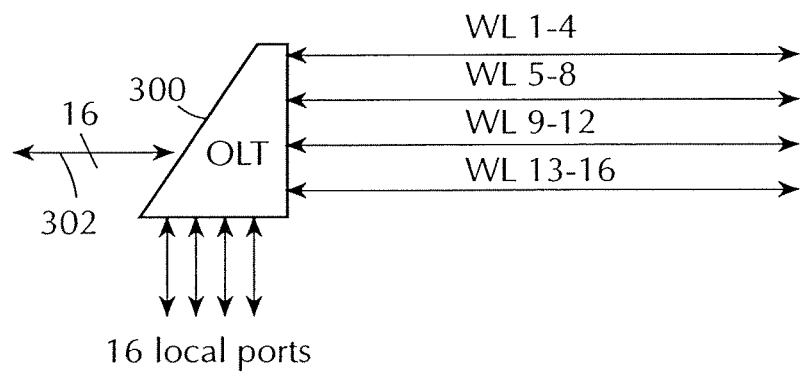
FIG. 4 is a schematic diagram representative of the optical line terminal of FIG. 1 or FIG. 3.

FIG. 4 is a simplified schematic diagram representative of the OLT 2 shown in FIG. 1 or the OLT 200 of FIG. 3. However, it is to be noted that for simplicity only 16 wavelengths are utilized. The OLT 300 interfaces and operates in a bidirectional manner as discussed in detail with respect to FIGS. 1 and 3. The line interface 302 is adapted for wavelength division multiplexed (WDM) optical communication signals of the highest relative order, in this example 16 wavelengths λ1-λ16, corresponding to the N optical wavelengths on a single optical fiber which are applied to input/output line interfaces 4 and 202 of OLT 2 (FIG. 1) and OLT 200 (FIG. 3), respectively. The pass-through interface connected to the lines WL 1-4, WL 5-8, WL 9-12 and WL 13-16 corresponds to the respective pass-through ports, and the local-interface connected to the lines labeled 16 local ports correspond to the local ports connected to the respective transponders, where wavelengths from or to client equipment are added or dropped.

Figure 5:
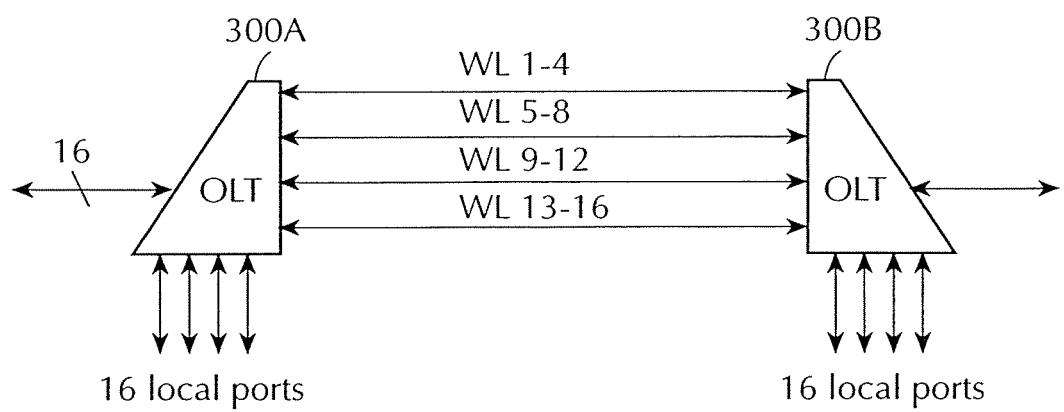
FIG. 5 is a schematic diagram of two optical line terminals such as in FIG. 4 being connected back-to-back.

FIG. 5 illustrates two OLTs 300A and 300B as shown in FIG. 4 connected in a back-to-back relationship by way of their respective all-optical pass-through interfaces. Thus, it is seen that the connection results in an optical add/drop multiplexer (OADM) functionality without requiring intermediate electro-optical conversion (OEO) of the communicated optical signals. As discussed above, the add/drop feature is achieved at the 16 local ports of each OLT, where channels (wavelengths) can be added or dropped by a manual configuration, or via add/drop switching, as controlled by switches 8 and 26 of FIG. 1, to achieve a switchable add/drop multiplexer.

The pass-through may be accomplished using single conductors and/or ribbon connectors that pass multiple individual channels (wavelengths) in one cable. The pass-through connections between OLTS 300A and 300B is preferably made using ribbon connectors/cables.

Figure 6:
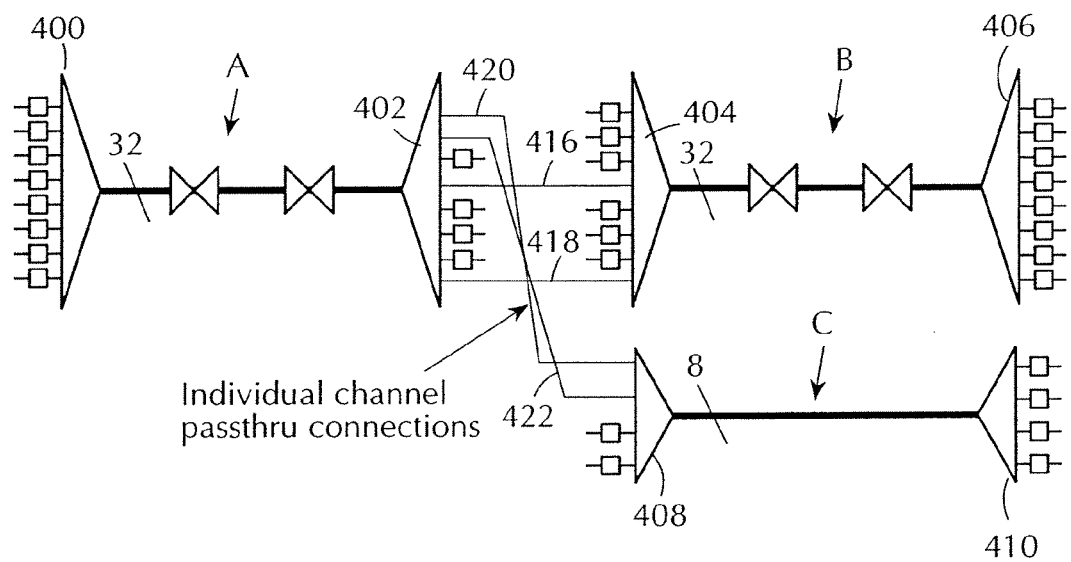
FIG. 6 is a diagram illustrating how at least two separate point-to-point WDM systems can be upgraded while in-service to form a merged point-to-point WDM system.

FIG. 6 illustrates three separate in-service WDM point-to-point optical communication systems A, B and C which are not initially interconnected. WDM system A includes optical nodes 400 and 402 which are optically connected via their respective line interfaces, with at least optical node 402 being an OLT. WDM system B includes optical nodes 404 and 406 which are optically connected via their respective line interfaces, with at least optical node 404 being an OLT. WDM system C includes optical nodes 408 and 410 which are optically connected via their respective line interfaces, with at least optical node 408 being an OLT.

As discussed above, the three separate WDM systems are not initially interconnected. However, any two of the three WDM systems, or all three of the WDM systems, may be interconnected by connecting respective OLTs of the separate WDM system back-to-back at respective pass-through ports as shown in FIG. 5, without disrupting service. For example, WDM system A may be connected to WDM system B by directly optically connecting pass-through ports of the OLT of node 402 to pass-through ports of the OLT of node 404 via optical fibers 416 and 418. WDM system A may also be connected to WDM system C by directly optically connecting pass-through optical ports of the OLT of node 402 to pass-through ports of the OLT of node 408 via optical fibers 420 and 422. Thus, an all optical path is provided from optical node 400 of WDM system A to optical node 406 of WDM system B, and likewise an all optical path is provided from optical node 400 of WDM system A to optical node 410 of WDM system C, resulting in a merger of WDM systems A, B and C without disrupting service. At the back-side of the respective optical nodes, lines with a box are indicative of local ports (L) to which client equipment is normally connected.

Figure 7:
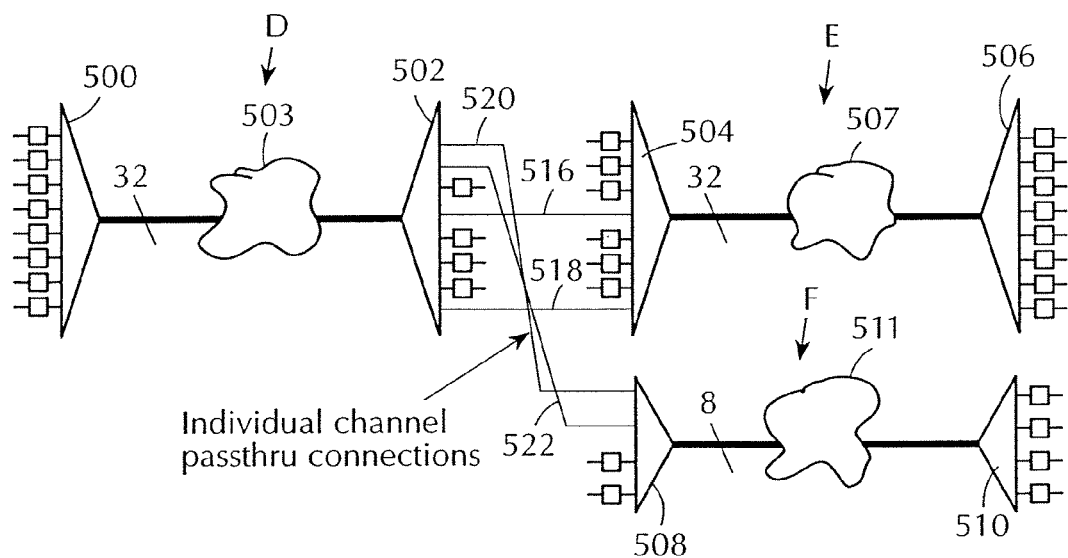
FIG. 7 is a diagram illustrating how at least two separate network WDM systems can be upgraded while in-service to form a merged network WDM system.

FIG. 7 illustrates three separate in-service WDM network optical communication systems D, E and F which are not initially interconnected. WDM system D includes optical nodes 500 and 502 which are optically connected via their respective line interfaces through an optical network 503, with at least optical node 502 being an OLT. WDM system E includes optical nodes 504 and 506 which are optically connected via their respective line interfaces through an optical network 507, with at least optical node 504 being an OLT. WDM system F includes optical nodes 508 and 510 which are optically connected via their respective line interfaces through an optical network 511, with at least optical node 508 being an OLT.

As discussed above, the three separate WDM optical networks are not initially interconnected. However, any two of the three WDM optical networks, or all three of the WDM optical networks may be interconnected by connecting respective OLTs of the separate WDM optical networks back-to-back at respective pass-through ports as shown in FIG. 5, without disrupting service. For example, WDM optical network D may be connected to WDM optical network E by directly optically connecting pass-through ports of the OLT of node 502 to pass-through ports of the OLT of node 504 via optical fibers 516 and 518. WDM system D may also be connected to WDM optical network F by directly optically connecting pass-through optical ports of the OLT of node 502 to pass-through ports of the OLT of node 508 via optical fibers 520 and 522. Thus, an all optical path is provided from optical node 500 of WDM optical network D to optical node 506 of WDM optical network E, and likewise an all optical path is provided from optical node 500 of WDM optical network D to optical node 510 of WDM optical network F, resulting in a merger of WDM network optical communication systems D, E and F without disrupting service. At the back-side of the respective optical nodes, lines with a box are indicative of local ports (L) to which client equipment is normally connected.

Figure 8:
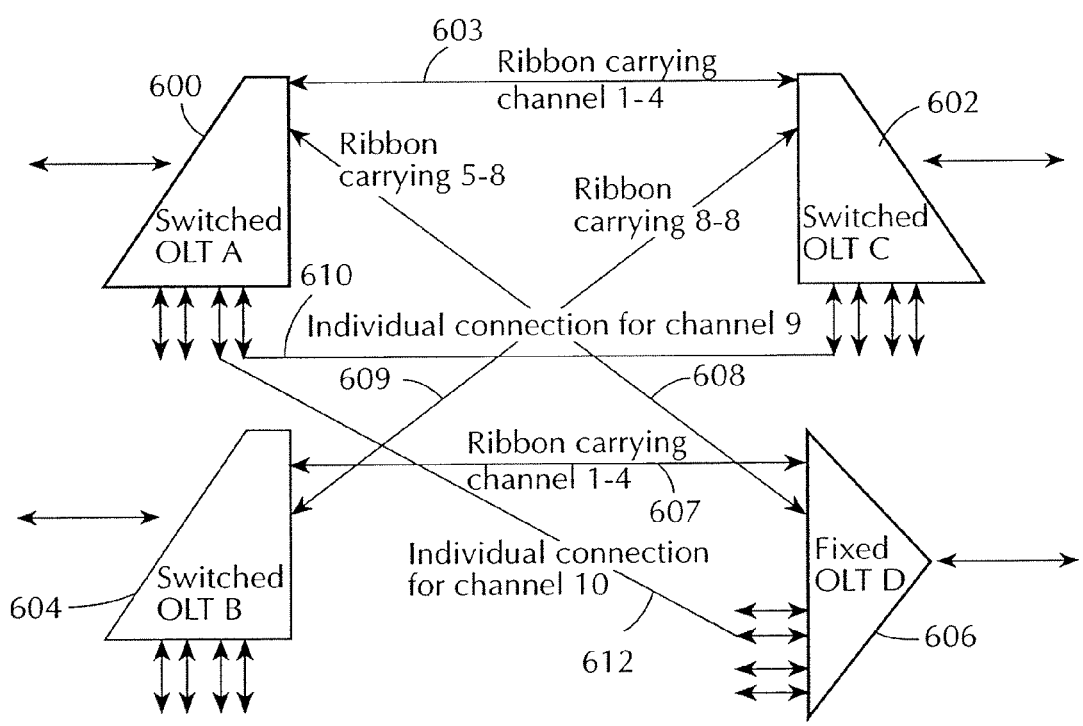
FIG. 8 illustrates a mesh connection between a plurality of optical line terminals.

FIG. 8 illustrates how OLTs can be connected in more complex ways to achieve greater functionality, such as, for example, limited cross-connection capabilities. Specifically, OLT 600 and OLT 602 are connected back-to-back to form a first OADM, OLT 604 and OLT 606 are connected back-to-back to form a second OADM, OLT 600 and OLT 606 are connected back-to-back to form a third OADM and OLT 602 and OLT 604 are connected back-to-back to form a fourth OADM. OLT 600, OLT 602 and OLT 604 each have add/drop switching capability, whereas OLT 606 has no switching capability.

The arrangement shown in FIG. 8 illustrates how a group of OLTs in an office, which may be part of separate WDM networks, can be coupled to form different OADMs on an individual channel or per band basis. Wavelengths 1, 2, 3 and 4 (channels 1, 2, 3 and 4) are connected between pass-through optical ports of OLT 600 and OLT 602 via optical fiber 603 and are also connected between pass-through optical ports of OLT 604 and OLT 606 via optical fiber 607. Wavelengths 5, 6, 7 and 8 (channels 5, 6, 7 and 8) are connected between pass-through optical ports of OLT 600 and OLT 606 via optical fiber 608 and are also connected between pass-through optical ports of OLT 602 and OLT 604 via optical fiber 609. Wavelengths 9, 10, 11 and 12 (channels 9, 10, 11 and 12) can be separated into individual channels that are connected between local ports of the respective OLTs. For example, channel 9 is directly connected between a local port of OLT 600 and a local port of OLT 602 via optical fiber 610, and channel 10 is directly connected between a local port of OLT 600 and a local port of OLT 606 via optical fiber 612. To simplify the drawing, no connections are shown for wavelengths 11 and 12; however, they may be connected in a like manner. The local ports may also be connected to client equipment as discussed above. It is to be noted that the connection configuration of FIG. 8 does not constitute a plain patch-panel form of connectivity, insofar as it allows for switching of channels without manual reconfigurations.

In summary, the methods and apparatus of the present invention allow upgrading of a wavelength division multiplexed optical communication system including a pair of OLTs that reside in the same office or facility and are part of separate WDM networks (whether point-to-point links or more advanced networks) to form an OADM. Such upgrade is accomplished without service disruption to the network by appropriate connection of the OLTs through the pass-through interfaces.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. A wavelength division multiplexed (WDM) optical communication system comprising:

a first optical line terminal having an input line-side interface adapted to receive a WDM optical communication signal communicated to the system across an optical fiber, a first transponder, an optical splitter coupled to the first transponder, a first all-optical pass-through interface, and a second all-optical pass-through interface;

a second optical line terminal having an output line-side interface adapted to transmit a WDM optical communication signal from the system across an optical fiber, an optical switch that can be used to select a wavelength to couple to said output line-side interface, and a first all-optical pass-through interface; and a third optical line terminal having an output line-side interface adapted to transmit a WDM optical communication signal from the system across an optical fiber, and a first all-optical pass-through interface;

the first all-optical pass-through interface of said first optical line terminal being connected to the first all-optical pass-through interface of said second optical line terminal to couple a first wavelength from the input line-side interface of said first optical line terminal through said splitter to said first transponder and, if said switch selects said wavelength, through said splitter and said switch to the output line-side interface of said second optical line terminal, the second all-optical pass-through interface of said first optical line terminal being connected to the first all-optical pass-through interface of said third optical line terminal to couple a second wavelength from the input line-side interface of said first optical line terminal to the output line-side interface of said third optical line terminal, said second optical line terminal further comprising a second transponder, wherein said switch couples a wavelength from said second transponder to the output line-side interface of said second optical line terminal through said switch if said switch alternatively selects said wavelength.

2. The wavelength division multiplexed optical communication system of claim 1, wherein said third optical line terminal further comprises an input line-side interface adapted to receive a WDM optical communication signal communicated to the system across an optical fiber, and a second all-optical pass-through interface connected to a second all-optical pass-through interface of said second optical line terminal to couple a wavelength from the input line-side interface of said third optical line terminal to the output line-side interface of said second optical line terminal through said optical switch if said switch alternatively selects said wavelength.

3. The wavelength division multiplexed optical communication system of claim 2, wherein said first all-optical pass-through interface of said first optical line terminal is connected to the first all-optical pass-through interface of said second optical line terminal through a first optical fiber, and said second all-optical pass-through interface of said first optical line terminal is connected to the first all-optical pass-through interface of said third optical line terminal through a second optical fiber that is not the first optical fiber, and said second all-optical pass-through interface of said third optical line terminal is connected to said second all-optical pass-through interface of said second optical line terminal through a third optical fiber that is not the first optical fiber and that is not the second optical fiber, and wherein the system is further adapted to communicate optical signals bidirectionally through each of said all-optical pass-through interfaces, and wherein an interface that is the input line-side interface of said third optical line terminal is also an output line-side interface.

4. An optical wavelength division multiplexed (WDM) add/drop multiplexing system, comprising:

a first input line-side interface and an output line-side interface;

a first transponder to which a first optical path of the system extends from the first input line-side interface, wherein the first transponder is an electro-optical conversion (OEO) device configured to receive a network-side optical signal and in response output a client-side optical signal, and wherein the system is operable to communicate a wavelength along the first optical path from the first input line-side interface to the first transponder to drop the wavelength, and wherein along the first optical path, between the first input line-side interface and the first transponder, the first optical path is established by at least an optical splitter;

a second transponder, wherein the second transponder is an electro-optical conversion (OEO) device configured to receive a client-side optical signal and in response output a network-side optical signal;

a second optical path, wherein in a first state of the system the second optical path extends from the first input line-side interface to the output line-side interface and, along the second optical path between the first input line-side interface and the output line-side interface, is established by at least the optical splitter and an optical switch, and wherein in the first state of the system the system is operable to communicate a wavelength along the second optical path from the first input line-side interface to the output line-side interface without any intervening electro-optical conversion (OEO) to pass the wavelength;

and wherein in a second state of the system the second optical path alternatively extends from the second transponder to the output line-side interface and, along the second optical path between the second transponder and the output line-side interface, is established by at least the optical switch, and wherein in the second state of the system the system is operable to communicate a wavelength along the second optical path from the second transponder to the output line-side interface to add the wavelength;

and wherein the optical splitter is configured to receive an optical signal comprising at least one wavelength, and to output at least two optical signals each comprising the at least one wavelength, wherein one of the at least two optical signals is output on the first optical path, and another of the at least two optical signals is output on an optical path that is the second optical path in at least the first state of the system and is not the first optical path.

5. The optical add/drop multiplexing system of claim 4, further comprising a second input line-side interface that is not the first input line-side interface, and wherein in a third state of the system the second optical path alternatively extends from the second input line-side interface to the output line-side interface and, along the second optical path between the second input line-side interface and the output line-side interface, is established by at least the optical switch, and wherein in the third state of the system the system is operable to communicate a wavelength along the second optical path from the second input line-side interface to the output line-side interface without any intervening electro-optical conversion (OEO) to pass the wavelength.

6. An optical wavelength division multiplexed (WDM) add/drop multiplexing system, comprising:

a first input line-side interface;
an output line-side interface;
an optical demultiplexer configured to receive a plurality of wavelengths multiplexed together as an optical signal, and to output each of the plurality of wavelengths as an individual wavelength;
an optical multiplexer configured to receive a plurality of individual wavelengths, and to output the plurality of wavelengths multiplexed together as an optical signal;
a first transponder to which a first optical path of the system extends from the first input line-side interface, wherein the first transponder is an electro-optical conversion (OEO) device configured to receive a network-side optical signal and in response output a client-side optical signal, and wherein the system is operable to communicate a wavelength along the first optical path from the first input line-side interface to the first transponder to drop the wavelength, and wherein along the first optical path, between the first input line-side interface and the first transponder, the first optical path is established by at least an optical splitter;
a second transponder, wherein the second transponder is an electro-optical conversion (OEO) device configured to receive a client-side optical signal and in response output a network-side optical signal;
an optical switch;
a second optical path, wherein in a first state of the system:
the second optical path extends from the first input line-side interface to the output line-side interface and is established by at least the optical splitter, the optical demultiplexer, the optical switch and the optical multiplexer;
along the second optical path, between the first input line-side interface and the optical switch, the second optical path is established by at least the optical splitter;
along the second optical path, between the optical splitter and the optical multiplexer and also between the optical demultiplexer and the optical multiplexer, the second optical path is established by at least the optical switch;
along the second optical path, between the optical switch and the output line-side interface, the second optical path is established by at least the optical multiplexer;
along the second optical path, between the first input line-side interface and the optical switch, the second optical path is established by at least the optical demultiplexer; and
the system is operable to communicate a wavelength along the second optical path from the first input line-side interface to the output line-side interface without any intervening electro-optical conversion (OEO) to pass the wavelength;
and wherein in a second state of the system:
the second optical path alternatively extends from the second transponder to the output line-side interface and is established by at least the optical switch and the optical multiplexer;
along the second optical path, between the second transponder and the optical multiplexer, the second optical path is established by at least the optical switch;
along the second optical path, between the optical switch and the output line-side interface, the second optical path is established by at least the optical multiplexer; and
the system is operable to communicate a wavelength along the second optical path from the second transponder to the output line-side interface to add the wavelength;
and wherein the optical splitter is not the optical demultiplexer, and wherein the optical splitter is configured to receive an optical signal comprising at least one wavelength, and to output at least two optical signals each comprising the at least one wavelength, wherein one of the at least two optical signals is output on the first optical path, and another of the at least two optical signals is output on an optical path that is the second optical path in at least the first state of the system and is not the first optical path.

7. The optical add/drop multiplexing system of claim 6, further comprising a second input line-side interface that is not the first input line-side interface, and wherein in a third state of the system:
the second optical path alternatively extends from the second input line-side interface to the output line-side interface and is established by at least the optical switch and the optical multiplexer;
along the second optical path, between the second input line-side interface and the optical multiplexer, the second optical path is established by at least the optical switch;
along the second optical path, between the optical switch and the output line-side interface, the second optical path is established by at least the optical multiplexer; and
the system is operable to communicate a wavelength along the second optical path from the second input line-side interface to the output line-side interface without any intervening electro-optical conversion (OEO) to pass the wavelength.

8. A method for an optical add/drop multiplexing system in an optical wavelength division multiplexed (WDM) network environment, comprising the steps of:
establishing a first optical path extending from a first input line-side interface of the system to a first transponder, wherein the first transponder is an electro-optical conversion (OEO) device configured to receive a network-side optical signal and in response output a client-side optical signal, and wherein along the first optical path, between the first input line-side interface and the first transponder, the first optical path is established by at least an optical splitter;
establishing a second optical path, wherein in a first state of the system:
the second optical path extends from the first input line-side interface to an output line-side interface and is established by at least the optical splitter, a first optical port, a second optical port that is not the first optical port, an optical demultiplexer, an optical switch and an optical multiplexer, and wherein the optical demultiplexer is configured to receive a plurality of wavelengths multiplexed together as an optical signal and to output each of the plurality of wavelengths as an individual wavelength, and wherein the optical multiplexer is configured to receive a plurality of individual wavelengths and to output the plurality of wavelengths multiplexed together as an optical signal;
along the second optical path, between the first input line-side interface and the first optical port, the second optical path is established by at least the optical splitter;
along the second optical path, between the optical splitter and the second optical port, the second optical path is established by at least the first optical port;
along the second optical path, between the first optical port and the optical switch, the second optical path is established by at least the second optical port;
along the second optical path, between the second optical port and the optical multiplexer and also between the optical demultiplexer and the optical multiplexer, the second optical path is established by at least the optical switch;

along the second optical path, between the optical switch and the output line-side interface, the second optical path is established by at least the optical multiplexer;

along the second optical path, between the first input line-side interface and the optical switch, the second optical path is established by at least the optical demultiplexer;

the second optical path extends from the first input line-side interface to the optical splitter in common with the first optical path; and the second optical path extends from the optical splitter to the output line-side interface not in common with the first optical path;

and wherein in a second state of the system:

the second optical path alternatively extends from a second transponder to the output line-side interface and is established by at least the optical switch and the optical multiplexer, wherein the second transponder is an electro-optical conversion (OEO) device configured to receive a client-side optical signal and in response output a network-side optical signal;

along the second optical path, between the second transponder and the optical multiplexer, the second optical path is established by at least the optical switch; and along the second optical path, between the optical switch and the output line-side interface, the second optical path is established by at least the optical multiplexer;

and wherein in a third state of the system:

the second optical path alternatively extends from a second input line-side interface to the output line-side interface and is established by at least the optical switch and the optical multiplexer, wherein the second input line-side interface is not the first input line-side interface;

along the second optical path, between the second input line-side interface and the optical multiplexer, the second optical path is established by at least the optical switch; and along the second optical path, between the optical switch and the output line-side interface, the second optical path is established by at least the optical multiplexer;

communicating along the first optical path, from the first input line-side interface to the first transponder, a wavelength of a WDM optical signal received by the system at the first input line-side interface, to drop the wavelength;

in the first state of the system, communicating without any intervening electro-optical conversion (OEO) along the second optical path a wavelength of the WDM optical signal received by the system at the first input line-side interface, to pass the wavelength to a WDM optical signal transmitted by the system from the output line-side interface;

in the second state of the system, alternatively communicating along the second optical path a wavelength to add the wavelength to a WDM optical signal transmitted by the system from the output line-side interface;

in the third state of the system, alternatively communicating along the second optical path a wavelength of a WDM optical signal received by the system at the second input line-side interface, to pass the wavelength to a WDM optical signal transmitted by the system from the output line-side interface; and wherein the optical splitter is not the optical demultiplexer, and wherein the optical splitter is configured to receive an optical signal comprising at least one wavelength, and to output at least two optical signals each comprising the at least one wavelength, wherein one of the at least two optical signals is output on the first optical path, and another of the at least two optical signals is output on another optical path that is the second optical path in at least the first state of the system.

9. The method of claim 8, wherein at least a portion of the first optical path extends from one modular card to another modular card, and wherein the system is further adapted to communicate optical signals bidirectionally through at least the first and second optical ports.

10. The method of claim 8, wherein at least a portion of the second optical path extends from one modular card to another modular card in at least the first state of the system.

11. The method of claim 10, wherein at least a portion of the second optical path extends from one modular card to another modular card in each of the second state of the system and the third state of the system.

\* \* \* \* \*